US006396598B1

(12) United States Patent
Kashiwagi et al.

(10) Patent No.: US 6,396,598 B1
(45) Date of Patent: May 28, 2002

(54) METHOD AND APPARATUS FOR ELECTRONIC MEMO PROCESSING FOR INTEGRALLY MANAGING DOCUMENT INCLUDING PAPER DOCUMENT AND ELECTRONIC MEMO ADDED TO THE DOCUMENT

(75) Inventors: Kouichi Kashiwagi, Nara; Naoki Urano, Osaka; Kouji Akasaka, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/140,772

(22) Filed: Aug. 26, 1998

(30) Foreign Application Priority Data

Aug. 26, 1997 (JP) .............................................. 9-229001
Jul. 30, 1998 (JP) .......................................... 10-215557

(51) Int. Cl.[7] .............................................. H04N 1/04
(52) U.S. Cl. ........................... 358/474; 382/187; 707/6
(58) Field of Search ................................ 358/474, 478, 358/479, 462, 450, 448, 400, 424; 382/312, 313, 314, 315, 187, 188, 189, 305, 306

(56) References Cited

U.S. PATENT DOCUMENTS

| 5,063,600 A | * | 11/1991 | Norwoow ..................... 382/13 |
| 5,659,639 A | * | 8/1997 | Mahoney ..................... 382/309 |
| 5,745,610 A | * | 4/1998 | Johnson ....................... 382/309 |
| 5,822,082 A | * | 10/1998 | Sato ............................. 358/401 |
| 5,831,615 A | * | 11/1998 | Drew ........................... 345/344 |
| 5,937,136 A | * | 8/1999 | Sato ............................. 386/52 |

FOREIGN PATENT DOCUMENTS

| JP | 1-026269 | 1/1989 |
| JP | 1-035652 | 2/1989 |
| JP | 1-037656 | 2/1989 |
| JP | 5-189185 | 7/1993 |
| JP | 9-091301 | 4/1997 |

OTHER PUBLICATIONS

Kashiwagi et al. "Electronic Annotation Sheet", Design of Computing Systems: Social and Ergonomic Considerations. Proceedings of the Seventh International Conference on Human–Computer Interaction (HCI International '97) San Francisco, California, USA, pp. 905–908, Aug. 24–29, 1997.

"Interacting with Paper on the Digital Desk", Communications of the ACM, vol. 36, No. 7, Jul. 1993, pp. 87–96.

"A Desk Which Responds to Operations on Real–World Objects", Interactive System and Software, II–WISS '94, Kindaikagakusha, Sep., 1994, pp. 19–28.

* cited by examiner

Primary Examiner—Jerome Grant, II
Assistant Examiner—Negussie Worku
(74) Attorney, Agent, or Firm—Nixon & Vanderhye P.C.

(57) ABSTRACT

An electronic memo adding and displaying apparatus 50 includes a tablet with integrated display for electronically acquiring an electronic memo to a document input by a user through a virtual transparent input sheet registered to be overlapped with an arbitrary object document 52, and for displaying the electronic memo on the virtual transparent input sheet, and a control unit 58 performing an electronic memo storing process, for storing the electronic memo acquired through the tablet with integrated display in a storage while associating the electronic memo with the object document.

12 Claims, 34 Drawing Sheets

FIG.7

DOCUMENT INFORMATION                                    130

| DOCUMENT ID | POSITION | TYPE OF DOCUMENT | AUTHOR | CREATION DATE | UPDATE DATE |
|---|---|---|---|---|---|
| doc008 | file://mars/jack/patent.txt | text | Jack | 1/7,1997 | 1/21,1997 |
| doc009 | file://mars/betty/photo1.jpg | jpeg | Betty | 1/26,1997 | 1/28,1997 |
| doc010 | file://www/info/index.htm | html | Kathy | 8/15,1996 | 8/15,1996 |
| ⋮ | ⋮ | ⋮ | ⋮ | ⋮ | ⋮ |

FIG.8

MEMO INFORMATION                             132

| MEMO ID | POSITION | AUTHOR | CREATION DATE |
|---|---|---|---|
| mem00801 | file://memos/00801.mem | Jack | 1/10,1997 |
| mem00802 | file://memos/00802.mem | Ken | 1/12,1997 |
| mem00803 | file://memos/00803.mem | Mike | 1/31,1997 |
| mem00901 | file://memos/00901.mem | Ken | 1/27,1997 |
| mem00902 | file://memos/00902.mem | Pochi | 1/31,1997 |
| ⋮ | ⋮ | ⋮ | ⋮ |

FIG.9

INDEX FILE OF MEMO STORAGE                                     136

| MEMO # | TYPE | POSITION ON DOCUMENT | RANGE | FILE NAME |
|---|---|---|---|---|
| 001 | text | (120,197) | (50,20) | 00802-1.txt |
| 002 | jpeg | (50,210) | (60,40) | 00802-2.jpg |
| 003 | wave | (140,20) | (20,20) | 00802-3.wav |
| 004 | file | (94,30) | (94,30) | http://www/research/result.htm |

FIG.10

DOCUMENT-MEMO CORRESPONDENCE INFORMATION          134

| REGISTRATION ID | DOCUMENT ID | MEMO ID |
|---|---|---|
| reg00001 | doc008 | mem00801 |
| reg00002 | doc008 | mem00802 |
| reg00003 | doc008 | mem00803 |
| reg00004 | doc009 | mem00901 |
| reg00005 | doc009 | mem00902 |
| ⋮ | ⋮ | ⋮ |

| | | |
|---|---|---|
| TXT | NOTE-PAD | C:¥Windows¥system32¥notepad.exe |
| DOC | MS-WORD | C:¥Program Files¥WinWord.exe |
| XLS | MS-EXCEL | C:¥Program Files¥Excel.exe |
| CVS | MS-EXCEL | C:¥Program Files¥Excel.exe |
| PPT | MS-PowerPoint | C:¥Program Files¥PowerPnt.exe |

| OPERATOR GRAPHIC FIGURE DATA | OPERATOR NAME | OPERATION |
|---|---|---|
| ✕ | DELETION | DELETE WORD BELOW DRAWN ✕ |
| ⬭ | EMPHASIS | CHANGE WORD BELOW DRAWN CIRCLE TO BOLD FONT |
| ∿ | UNDERLINE | UNDERLINE WORD BELOW DRAWN WAVE |

| OPERATOR NAME | MESSAGE TO EXTERNAL APPLICATION |
|---|---|
| DELETION | WM_USER_DELETE_WORD |
| EMPHASIS | WM_USER_BOLD_WORD |
| UNDERLINE | WM_USER_UNDERLINE_WORD |

FIG.35

★Invitation to 8th Technical Conference
   (Multimedia Promotion Department)
The 8th technical conference will be focused on "mobile communication technique". Proposals and suggestions from view points of those from engineers in charge of related technique/product development are welcome. *and managers*

Date:    January 19 (Fri) 1:00PM~5:00PM → *6:00PM*
Place:   Tokyo IC Main Branch (Details will follow)
Subject: Introduction (1:00~1:10) by Mr. Matsuda,
         MM Promotion Department
         Mobile Communication Technique (1:10~2:30) by
         Mr. Sakamoto, Multimedia Technical Laboratory
         Question and Answer (2:30~2:50)

690 — DELETE THIS LINE

⇧

★Invitation to 8th Technical Conference          692
The 8th technical conference will be focused on "mobile communication technique". Proposals and suggestions from view points of those from engineers in charge of related technique/product development are welcome. *and managers*

Date:    January 19 (Fri) 1:00PM~5:00PM
Place:   Tokyo IC Main Branch (Details will follow *6:00PM*
Subject: Introduction (1:00~1:10) by Mr. Matsuda,
         MM Promotion Department
         Mobile Communication Technique (1:10~2:30) by
         Mr. Sakamoto, Multimedia Technical Laboratory
         Question and Answer (2:30~2:50)

LINES 3+ MOVE UPWARD

⇨ ADJUST DISPLAY POSITION OF PEN TRACK DATA

694

★Invitation to 8th Technical Conference
   (Multimedia Promotion Department)
The 8th technical conference will be focused on "mobile communication technique". Proposals and suggestions from view points of those from engineers in charge of related technique/product development are welcome. *and managers*

Date:    January 19 (Fri) 1:00PM~5:00PM → *6:00PM*
Place:   Tokyo IC Main Branch (Details will follow)
Subject: Introduction (1:00~1:10) by Mr. Matsuda,
         MM Promotion Department
         Mobile Communication Technique (1:10~2:30) by
         Mr. Sakamoto, Multimedia Technical Laboratory
         Question and Answer (2:30~2:50)

METHOD AND APPARATUS FOR ELECTRONIC MEMO PROCESSING FOR INTEGRALLY MANAGING DOCUMENT INCLUDING PAPER DOCUMENT AND ELECTRONIC MEMO ADDED TO THE DOCUMENT

BACKGROUND OF THE INVENTION

1. Field of the Invention

The present invention relates to document creation and communication through the document. More specifically, the present invention relates to method and apparatus allowing addition and display of an electronic memo to a document no matter whether the document is electronic or paper document, as well as to a computer readable recording medium storing an electronic memo processing program for implementing the electronic memo processing method.

2. Description of the Background Art

Recently, it is a common practice to create a document by using an apparatus called a word processor, dedicated for document creation, or by using an application software for document creation executed on a computer. Such method is advantageous in that modification and addition to the document can readily be performed. In companies and offices, however, though a person in charge creates a document by using such an application program, the document thus created by the person in charge is rarely distributed intact. It is more general that the created document is once printed, proof-read by a supervisor or a colleague, the result of correction is reflected on the original document file and the document thus refined to higher completeness is then distributed. In such a case, the content of modification or comments are written by a pen on the printed copy of the document.

Such a method is advantageous in that portions and contents of modification can be recognized at one sight, and that proof reading can readily be done even by one not accustomed to computer operation, as the method does not require any computer operation. Further, document review on paper medium is advantageous in that a large number of pages can be read through in quite a short time period and that pages far apart from each other can readily be compared. Such advantageous are not available in a display device such as a computer.

The method, however, is disadvantageous in that it is difficult to integrally manage correspondence between the document stored in the computer and the modification memo written on the sheet of paper. It is often the case that a person other than the author does proof reading or creates comments on the document, and that several persons do such process on the identical document. In such a case, it is necessary to integrally manage the document stored in the computer and considerable amount of memos and comments written on the paper medium, for the document. In the conventional method, such an integrated management has been extremely difficult. In order to overcome such disadvantages, a system for integrally managing paper document, electronic document and a memo or comment created for the document has been desired.

Several proposals have been made to solve the above described problem, for a technique of adding a comment to a document which is being created or to refer to a comment added to the document, by using a common computer set. A typical example is a "substance/alias" model of TRON (The Real-Time Operating system Nucleus) project (first prior art). According to the technique, the data has data substance (substantive entity) and an icon (alias) and the alias is incorporated in an arbitrary data substance, whereby the data comes to have a function of a sort of hypertext.

Japanese Patent Laying-Open Nos. 1-026269, 1-035652 and 1-037656 disclose a method of document edition in which alternative character string for a character string in a document and information related thereto are stored, and the alternative character string is displayed as needed. A technique utilizing a "desk" on which one works provided with a function of a computer, allowing communication between the one and the computer has been proposed in "Interacting with Paper on the Digital Desk" (*Communications of the ACM*. Vol. 36, No. 7, 1993) or in "A Desk Which Responds to Operations on Real-World Objects" (*Interactive System and Software*, II-WISS'94, Kindaikagakusha, September, 1994) (Second Prior Art).

According to the second prior art, a camera is placed on a desk, movement of objects on the desk and movement of the user are monitored, and in accordance with the monitored situation, an image plane created by a computer is cast by a projector on the desk, thereby allowing communication between the computer and the user. When a user takes an action on an object on the desk or on the image plane cast by the projector, the function of the computer allotted to the object or the image plane is activated, and the result is projected on the desk. Especially in the article entitled "Interacting with Paper on the Digital Desk", through the recognition of a graphic figure written on the desk, communication with the computer through paper medium is contemplated.

Japanese Patent Laying-Open No. 9-91301 proposes another technique attempting communication with the computer through paper medium (third prior art). This technique is to apply the concept of hypertext and hyper media, which has been a closed technique in the computer world, to paper document. For this purpose, according to the technique, document component to which related information has been added, is printed with some mark, for example, a screen. The user marks by a marker, a desired document component of the printed paper document. The paper document is scanned by a scanner to be input to the computer, and information related to the marked document component is output to the printer or to an output device such as a computer display.

When the document is to be output to a paper medium to be proof-read, it is necessary to print the document in plural copies, corresponding to the number of persons who will proof-read the document. This leads to increased printer paper consumption. When the content of the document is to be proof-read by a person at a remote distance, to expedite processing, it is necessary to transfer the document by a facsimile, for example, and to receive the proof-read copy again by utilizing a facsimile, for example, which procedure is inconvenient. Further, as already mentioned, it is difficult to integrally manage correspondence between the electronic document file stored in the computer and handwritten comments on the document printed on sheets of paper. It is convenient if works such as proof reading can be done without using paper medium, if possible. For that purpose, one cannot help but use a computer. However, it is desired for those not accustomed to computer operation in general and word processor software operation in particular, especially for those not good at input through keyboards, that the processing of the document can be done in the similar manner as on a paper medium.

Among the above described three prior art techniques, the first prior art technique may be considered a method of managing a memo added to the document. This technique is closed in a computer environment, and therefore, it is disadvantageous in that it cannot be applied to processing such as proof reading of the document on paper medium. In the modern society with much developed computer technique, almost everything which can be done using paper can also be done on the computer. Nevertheless, formidable amount of paper is still consumed and it is said that the paper consumption is ever increasing along with the wide spread use of the computers. The reason for this may be the better visual comprehension of the document written on a sheet of paper, especially the document printed out by the computer. This urges transfer of information from the computer to paper medium, to which information such as memo is added. Such new information added to the paper medium is not reflected on the original information in the computer, and rather, the information is diffused. Accordingly, there is an increasing demand of a technique which integrates paper medium and electronic medium which can be managed by a computer, and to integrally manage information such as memo added to the paper medium related to the electronic information.

In the second prior art technique, even when the memo written by the user on a sheet of paper is taken in the computer, correspondence between the memo and the paper medium on which the memo has been actually written is not stored. Therefore, integral management of the memo and the paper medium is not possible. Further, as the user directly writes the memo on the sheet of paper, if long memo is written, visual comprehension is degraded. Further, the device for this prior art technique is of large scale and not portable.

The third prior art technique contemplates communication with electronic medium through paper. However, the work of adding information to the document such as addition of a memo has to be done in the conventional closed world of the computer. Further, in order to draw information from the paper document, it is necessary for the user to directly mark the document on the paper. Further, the marked document must be read by a scanner. This may contaminate the document and if there are various and many items described on the document and marks are crowded, or if the marks are not clear enough, necessary information would not be read from the document, making it difficult to draw related information therefrom.

A function of adding data manually written by a pen input to a document file created by using an application program, as a mechanism allowing direct manual writing of electronic comment to an electronic document, has already been implemented by a conventional application program. In the application program, the user is allowed to add pen input data when operational mode is switched to "drawing" mode, which is different from a document editing mode.

However, the function is closed in a single application and is not a general mechanism. Therefore, a document created by another application cannot be processed. This means that various and many applications must each have a mechanism for handling pen input data. Further, the memo created in this manner is integrated with the original document, and therefore the memo created in this manner cannot freely be taken out and used for other application programs. If a document file is created by one application and even if another application has a function of reading and displaying the document file, the layout of the document created by the aforementioned one application is not always reproduced as it is. Therefore, there would be documents of various different layouts with memos written therein. Therefore, it is difficult to integrally manage the memo and electronic documents.

Further, in the application of the prior art described above, the pen input data constitutes part of the document. Therefore, it is not possible to separately extract only the pen input data from other parts of the document and to use the pen input data for another purpose.

One solution of such problems has been proposed in Japanese Patent Laying-Open No. 5-189185. In the invention described in this laid-open application, an image data is drawn on a window. A transparent window is provided virtually on the drawn image data, and an image can be drawn without damaging the aforementioned image drawn on the window. Utilizing this mechanism, an image of a document file is first drawn, and a memo is drawn by a pen on the virtual transparent window, and in this manner, the user can operate with a feeling as if the user modifies, corrects or writes memo on a paper.

However, the method disclosed in Japanese Patent Laying-Open No. 5-189185 allows only drawing of another image without damaging the base image. This method is silent about a framework which allows a plurality of users at separate positions to write memos on one document file. Accordingly, the method as it is is not applicable to proof reading of a document, for example.

SUMMARY OF THE INVENTION

Therefore, an object of the present invention is to provide method and apparatus of electronic memo processing which allow integral management of a memo added to a document together with the document, regardless of the media, and to provide a computer readable recording medium storing an electronic memo processing program.

Another object of the present invention is to provide method and apparatus for an electronic memo processing which allow addition of an electronic memo to a document regardless of the medium, with a feeling as if a comment is written by a pen on a sheet of paper, thereby to facilitate participation of even a user not accustomed to computer operation, to document proof reading operation, and to provide a computer readable recording medium storing the electronic memo processing program.

A still further object of the present invention is to provide method and apparatus of electronic memo processing allowing addition of electronic memo to a paper document, and allowing integral management of the electronic memo with the original paper document, and to provide a computer readable recording medium storing the electronic memo processing program.

A still further object of the present invention is to provide method and apparatus of electronic memo processing allowing modification of a document file on an electronic medium with a feeling as if correction is made on a sheet of paper, and allowing document modification operation even by a user not accustomed to computer operation, and to provide a computer readable recording medium storing the electronic memo processing program.

A still further object of the present invention is to provide method and apparatus of electronic memo processing allowing addition of electronic comments by a plurality of users to a document regardless of the medium, and allowing easy distinction among these comments, and to provide a computer readable recording medium storing the electronic memo processing program.

The electronic memo processing apparatus in accordance with the present invention includes a document identifying device for identifying an arbitrary object document; an electronic memo retrieving device for retrieving, from a storing device, an electronic memo related to the document identified by the document identifying device; and a display device for displaying the memo on a virtual transparent input sheet registered or positioned to be overlapped with the object document.

As the electronic memo related to the object document is retrieved from a storage device and displayed registered to be overlapped with the object document, the electronic memo and document are viewed together as if the memo is written on the document.

Preferably, the electronic memo processing apparatus includes an electronic memo acquiring device for electronically acquiring electronic memo to a document, input by a user through a virtual transparent input sheet registered to be overlapped with the arbitrary object document, and an electronic memo storing device for storing the electronic memo acquired by the electronic memo acquiring device, associated with the object document, in a storage.

It is possible for the user to input electronic memo on a virtual transparent input sheet overlapped with the document, and to store the electronic memo by associating the memo with the document. Therefore, even a user not accustomed to operation of an input device such as a keyboard, can readily input the electronic memo to the document, and the electronic memo can be managed integrated with the document.

Preferably, the object document is a document on a paper medium, and the apparatus further includes an image pickup device for taking the object document as an image, an image recognizing device for recognizing the content of the document based on the image taken by the image pickup device, and a device for identifying the object document based on the content of the document recognized by the image recognizing device.

A camera, for example, may be used for taking in the document as an image. This allows identification of the document without the necessity of providing an identifier to the document.

Preferably, the object document is a document electronically created and thereafter printed on paper medium, and the electronic memo processing apparatus further includes a device for searching for and taking out an electronically created document corresponding to the printed document identified by the image recognizing device and the identifying device, from a document storage.

When an electronically created document is printed on a paper medium, it means that an electronic document corresponding to the document on the paper is stored in a document storage. Therefore, by taking out the electronically created document corresponding to the document identified by the image recognizing device and the identifying device from the document storage, it becomes possible to associate the electronic memo added to the document printed on the paper with the original electronic document. Therefore, integral management of the document and the electronic memo is allowed, utilizing paper medium also. Further, when a single electronic document is printed in plural copies, proof-read and modified by a plurality of persons through electronic memos, it is possible to integrally manage the plurality of electronic memos and the original electronic document.

Preferably, the electronic memo processing apparatus further includes a modification detecting device for detecting how the object document is modified after last addition of an electronic memo, and a layout adjusting device for adjusting position of display of the electronic memo on the object document, in accordance with the layout modification of the object document detected by the modification detecting device.

If the layout of the document is modified and the position where the memo is to be displayed is kept as it is, the memo would be displayed at a portion different from that portion where the memo has been initially added on the document. Therefore, if the layout of the document is modified, the position of display of the memo is changed in accordance with the layout modification, so that the memo is always displayed at a light position.

More preferably, the object document is a document on an electronic medium and, more preferably, the electronic memo processing apparatus in accordance with the present invention further includes a device for retrieving an object document from the document storage and for creating a document image; a device for creating an image of an electronic memo retrieved by the electronic memo retrieving device; and a selective synthesizing device for displaying arbitrary one of the document image and the image of the electronic memo, or displaying the document and memo images synthesized, in accordance with a user's designation.

If the object document is an electronic document, it is possible to create a document image by retrieving the document from the document storage using a document retrieving device, without the necessity of printing the document. Thus formed document image may be displayed synthesized with the electronic memo, or either one of the images of the document and the memo may be displayed by itself. Therefore, the document and the electronic memo can be displayed in any form among the form of the original document alone, the form of the electronic memo alone, and the form when the document is printed on a paper medium and the memo is written thereon. Therefore, as compared with the memo simply written on the paper medium, it is possible to browse and manage the document and the memo more effectively.

Preferable, the format of the electronic memo stored in the electronic memo storing device includes a plurality of electronic memos associated with the object document, and each of the plurality of electronic memos includes attribute data. The display device displays the plurality of electronic memos in different manners of display dependent on the attributes. In this case, "manner of display" includes "not displaying", dependent on the attribute.

As the electronic memo is displayed in different manner of display in accordance with the attribute, the electronic memos can be displayed and readily distinguished from each other on the basis of who created the memos, where the memos are created, when the memos are created or by what electronic memo processing apparatus the memos are created.

Preferably, the object document is an electronic document, and the electronic memo processing apparatus further includes an operator recognizing device for electronically acquiring and recognizing an operator for the document, which is manually input by a user through the virtual transparent input sheet; and a document modification device for modifying the electronic document in accordance with the operator acquired by the operator recognizing device.

When the user manually inputs an operator for the document on the virtual transparent input sheet displayed overlapped on the document, the operator is recognized, and the electronic document is modified in accordance with the operator. The electronic document can be modified easily in an intuitive, readily comprehensible manner, as compared with the use of a keyboard, for example.

More preferably, the electronic memo processing apparatus further includes a modification detecting device for detecting how a layout of the object document is modified by the document modifying device, and a layout adjusting device for adjusting position of display of the electronic memo of the object document, in accordance with the layout modification of the object document detected by the modification detecting device.

If the layout of an electronic document is modified and the position of display of the memo is kept as it is, the memo would be displayed at a position different from that position at which the memo is originally added to the document. In order to avoid such inconvenience, if the document layout is modified, the position of display of the memo is changed in accordance with the layout modification, so that the memo is always displayed at a right position.

According to another aspect of the present invention, the electronic memo processing apparatus includes a display device for displaying an electronic document; an operator recognizing device for electronically acquiring and recognizing an operator for the document, manually input by a user on a virtual transparent input sheet registered to be overlapped with the object document; and a device for modifying the electronic document in accordance with the operator acquired by the operator recognizing device.

When the user manually inputs an operator for the document on a virtual transparent input sheet displayed overlapped with the electronic document, the operator is recognized and the electronic document is modified in accordance with the operator. Therefore, the electronic document can be modified easily in more intuitive, readily comprehensible manner, as compared with the use of a keyboard, for example.

According to a still further aspect of the present invention, the electronic memo processing method includes the steps of identifying an object document; retrieving an electronic memo associated with the document identified in the step of document identification from a storage; and displaying the electronic memo searched in the step of searching on a virtual transparent input sheet registered to be overlapped with the object document.

Preferably, the electronic memo processing method further includes the steps of: electronically acquiring an electronic memo to a document input by a user through a virtual transparent input sheet registered to be overlapped with an arbitrary object document; and storing the electronic memo acquired in the step of acquiring the electronic memo in storage, by associating the memo with the object document.

Preferably, the step of display includes the step of displaying the electronic memo on a binocular type display device having transparent display portion, displaying the object document and track of manually written data overlapped with each other, when worn by the user.

More preferably, the object document is a document on a paper medium, and the step of identifying the document includes the steps of: taking the object document as an image; recognizing content of the document based on the image taken in the step of taking the document as an image; and identifying the object document based on the content of the document recognized by the step of recognizing the image.

Preferably, the object document is a document created electronically and thereafter printed on a paper medium, and the electronic memo processing method further includes the step of searching for and taking an electronically created document corresponding to the document identified by the step of recognizing the image, from document storage.

More preferably, the electronic memo processing method further includes the steps of: detecting how layout of the object document is modified after last addition of an electronic memo to the object document; and adjusting position of display of the electronic memo for the object document, in accordance with the layout modification of the object document detected in the step of detecting modification.

Preferably, the object document is a document on an electronic medium, and the electronic memo processing method further includes the steps of creating a document image by retrieving the object document from the document storage, and displaying the document image synthesized with the searched electronic memo in the step of displaying the electronic memo. In the step of synthesizing and displaying, the document image and the image of the electronic memo may be synthesized by obtaining exclusive OR of the document image and the image of the electronic memo retrieved in the step of displaying the electronic memo.

More preferably, the object document is an electronic document and the electronic memo processing method further includes the steps of: electronically acquiring and recognizing an operator for the document manually input by the user through a virtual transparent input sheet; and modifying the electronic document in accordance with the operator acquired in the step of recognizing the operator.

Preferably, the electronic memo processing method further includes the steps of: detecting how a layout of the object document is modified in the step of document modification; and adjusting position of display of the electronic memo for the object document, in accordance with the layout modification of the object document detected in the step of detecting modification.

According to a still further aspect of the present invention, the electronic memo processing method includes the steps of: displaying an electronic document; electronically acquiring and recognizing an operator for the document manually input by a user through a virtual transparent input sheet registered to be overlapped with the object document; and modifying the electronic document in accordance with the operator acquired in the step of recognizing the operator.

According to a still further aspect of the present invention, the recording medium is a computer readable recording medium storing a computer program for implementing the electronic memo processing method described above.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows document information configuration.

FIG. 8 shows memo information configuration.

FIG. 9 shows configuration of an index file of a memo storage in the electronic memo processing apparatus in accordance with the first embodiment.

FIG. 10 shows configuration of document-memo correspondence information.

FIG. 25 is bit representation of the process of pixel synthesization utilizing exclusive OR.

FIG. 31 shows an operator table used in the electronic memo processing apparatus used in the sixth embodiment.

FIG. 32 shows an operator name/message table, showing correspondence between operator names and messages.

FIG. 35 shows a manner of re-adjustment of the position for displaying pen track data.

DETAILED DESCRIPTION OF THE PREFERRED EMBODIMENTS

First Embodiment

Figure 1:
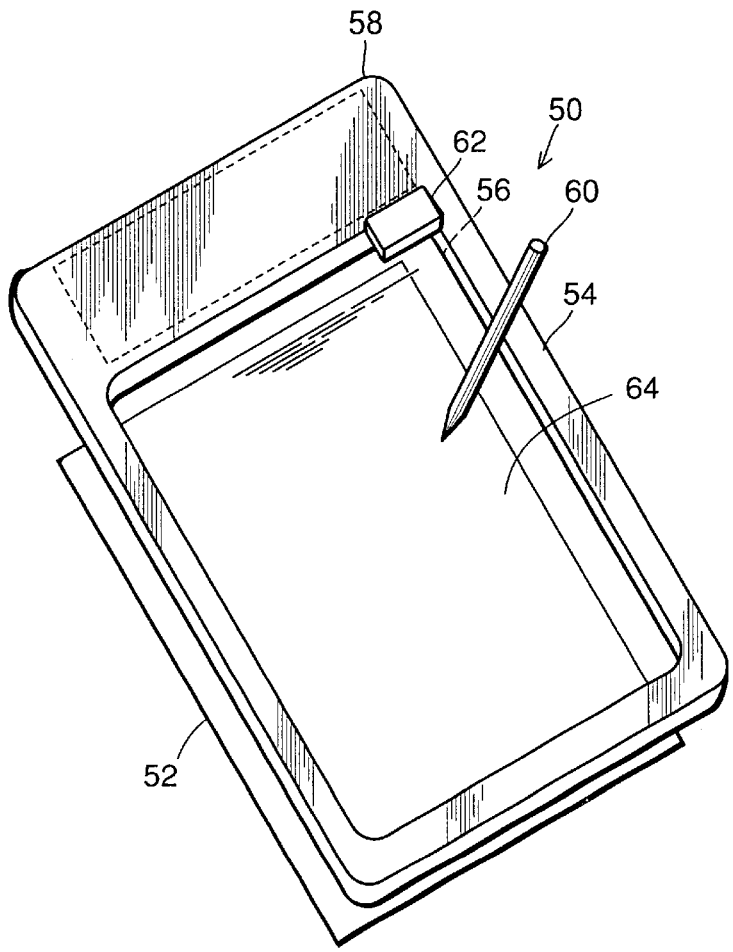
FIG. 1 is a schematic diagram of an electronic memo processing apparatus in accordance with a first embodiment of the present invention.

A first embodiment of the present invention will be described specifically with reference to the figures. An electronic memo processing apparatus 50 in accordance with a first embodiment of the present invention includes a frame 54 having an opening 56 placed over a document 52 on a paper medium, a transparent display unit with integrated input/output provided at opening 56, a scanner 62 provided at an upper right portion of opening 56 (a position corresponding to right shoulder of opening 56) for reading an identifier or the like added to a right shoulder portion of document 52, a pen 62 used by a user for manually inputting a character or a graphic figure to the display unit with integrated input/output, and a control device 58 contained within one side of frame 54. Though control device 58 is contained in frame 54 in the present embodiment, it may be separated from frame 54. Alternatively, only a part of control device 58 may be contained in frame 54 and remaining part may be separated.

Figure 2:
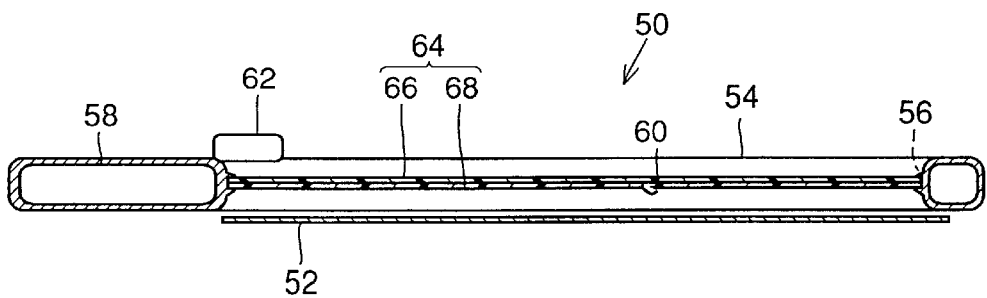
FIG. 2 is a schematic cross section of the electronic memo processing apparatus in accordance with the first embodiment of the present invention.
Figure 3:
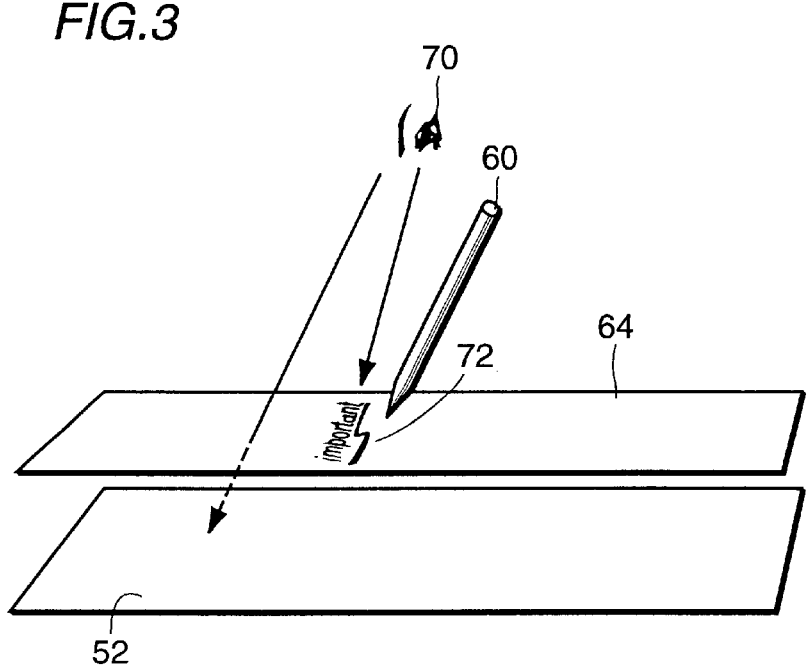
FIG. 3 illustrates an operation of the electronic memo processing apparatus in accordance with the first embodiment of the present invention.
Figure 4:
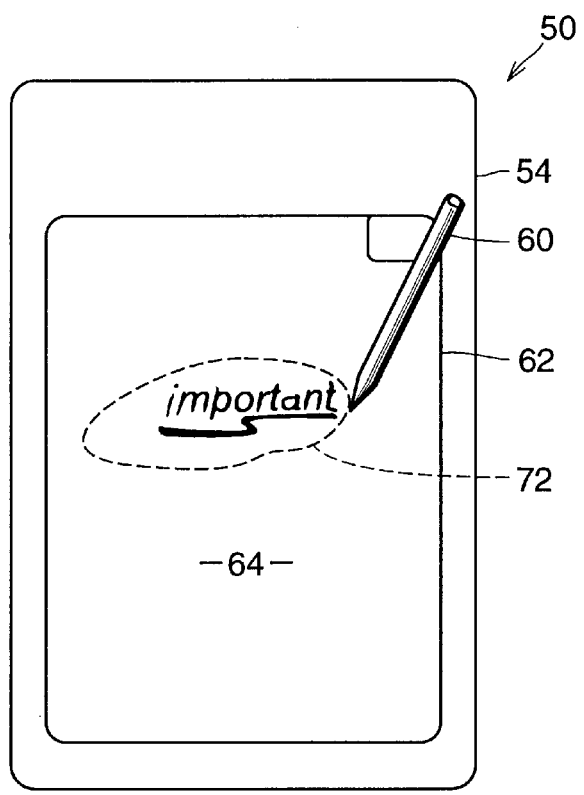
FIG. 4 is a plan view illustrating the operation of the electronic memo processing apparatus in accordance with the first embodiment of the present invention.

Referring to FIG. 2, display device 64 with integrated input/output includes a see through display device 68 which is transparent and through which document 52 arranged therebelow can be seen (in the following, simply referred to as "see through"), and a transparent tablet 66 stacked on see through display device 68.

Referring to FIGS. 1 to 4, when electronic memo processing apparatus 50 is placed on a document 52, a user 70 can see document 52 through display device 64 with integrated input/output. When an electronic memo 72 is written by means of a pen 60 on tablet 66 and displayed on real time on see through display device 68, operation as if the memo is manually written to document 52 is possible. Details of the operation of electronic memo processing apparatus 50 will be described later.

Figure 5:
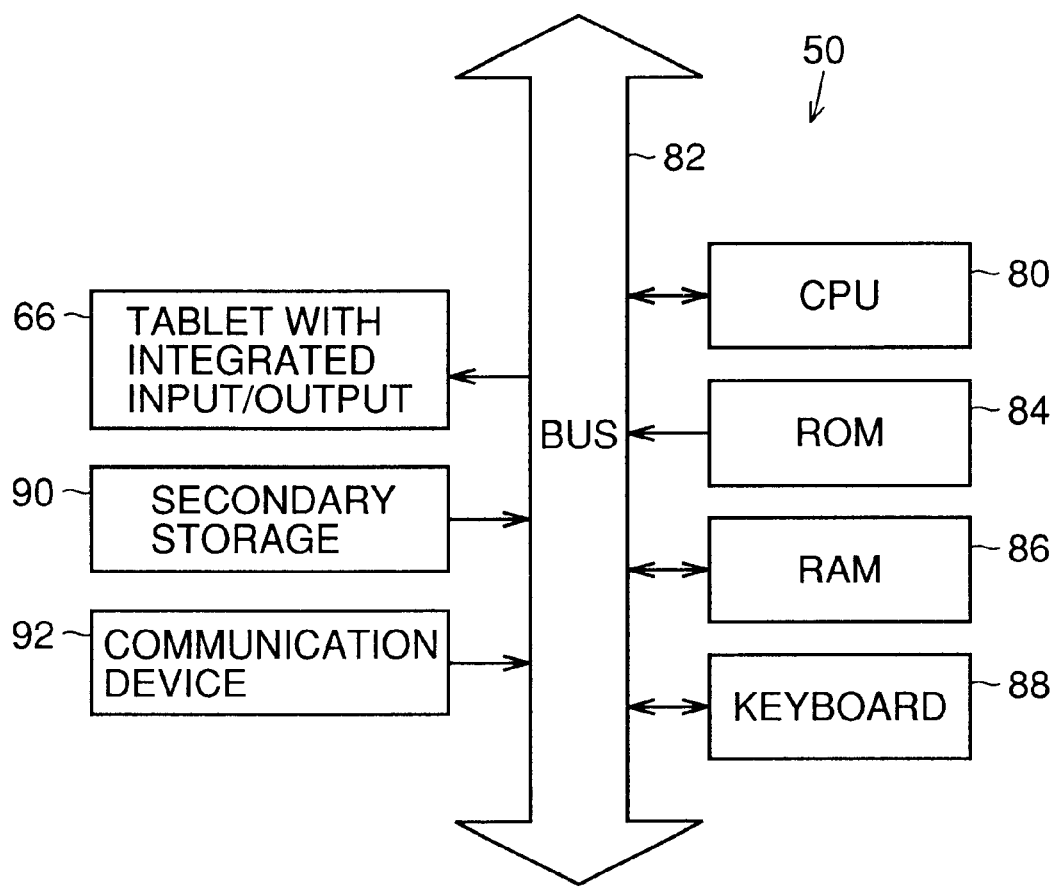
FIG. 5 is a block diagram schematically showing a hardware of the apparatus implementing the electronic memo processing apparatus in accordance with the first and other embodiments of the present invention.

FIG. 5 shows hardware configuration of electronic memo processing apparatus 50 in accordance with the first embodiment. Referring to FIG. 5, electronic memo processing apparatus 50 substantially consists of a computer, and includes a CPU (Central Processing Unit) 80, a bus 82 connected to CPU 80, and a tablet 66, a read-only memory (ROM) 84, a random access memory (RAM) 86, a detachable keyboard.88, a secondary storage 90 and a communication device 92 for connecting the electronic memo processing apparatus 50 to the network, each connected to bus 82. Secondary storage 90 may be a hard disk or a flash memory. Though not shown in FIGS. 1 to 4, keyboard 88 is detachable, and allows keyboard input in addition to manual input by pen 60. If manual memo input only is desired, keyboard 88 is unnecessary.

Figure 6:
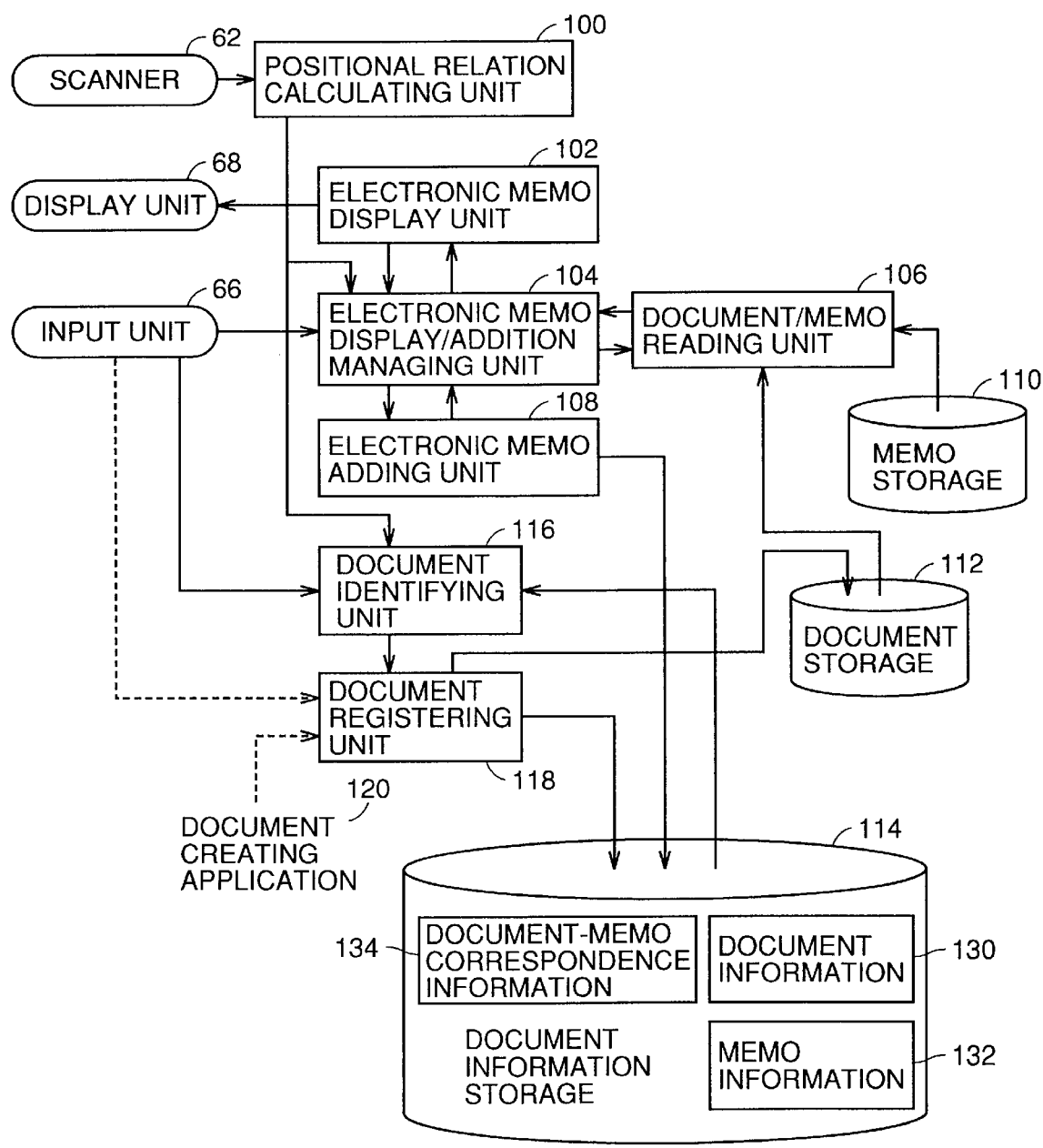
FIG. 6 is a functional block diagram of the electronic memo processing apparatus in accordance with the first embodiment of the present invention.

Referring to FIG. 6, functionally, electronic memory processing apparatus 50 includes: a document storage 112 for storing a document; a memo storage 110 for storing a memo; a document information storage 114 for storing document information; a scanner 62; see through display device 68; tablet 66 operating as an input device, cooperating with pen 60; a positional relation calculating unit 100 for calculating positional relation of document 52 with respect to electronic memo processing apparatus 50, based on information read by scanner 62; a document identifying unit 116 for specifying document information and memo information necessary for memo addition/display process, based on an identifier added to document 52, read by scanner 62; a document registering unit 118 for taking the document in a system when the document is unregistered; a document/memo reading unit 106 for reading original document and a memo from memo storage 110, document storage 112 and document information storage 114 based on document information and memo information specified by document identifying unit 116; an electronic memo display unit 102 for displaying the memo on see through display device 68, based on the read document information and memo information; an electronic memo adding unit 108 for creating/registering new memo; and an electronic memo/addition managing unit 104 for controlling operations of electronic memo display unit 102 and electronic memo adding unit 108.

As an input device, a scanner for scanning the whole paper document may be provided, in addition to scanner 62. In the present embodiment, positional relation calculating unit 100 calculates positional relation based on the information of document 52 read by scanner 62. If document 52 is always set at the same position without fail, however, positional relation calculating unit 100 is not necessary. The device for calculating the positional information is not limited to scanner 62. The positional information may be calculated based on an image of document 52 photographed by a camera, for example.

Referring to FIG. 6, document information storage 114 includes document information 130, memo information 132 and document-memo correspondence information 134.

Referring to FIG. 7, document information 130 includes a document identifier (document ID) of each document, position of the document, type of the document, author of the document, creation date of the document and update date of the document. Therefore, when a document ID is known, the position where the document exists can be found, and the document can be taken out or retrieved from document storage 112.

Though document storage 112 is depicted as one collective secondary storage in FIG. 6, it is actually a virtual storage. The substances of the documents may be in the computer system or distributed over computer network. In short, what is necessary is that the document is accessible from the electronic memo processing apparatus of the present embodiment. In the example shown in FIG. 7, URL (Uniform Resource Locator) is used to represent the position of the document. However, the format is not limited, and any format may be used provided that it can specify the position of the file. Considering the operation of retrieving document file from a remote terminal or a server through a network, however, it is most practical at present to use URL as in the present example.

Referring to FIG. 8, memo information 132 includes, for each electronic memo, a memo identifier (memo ID), position of the memo, author of the memo and creation date of the memo. If a memo ID is known, the position can be found from memo information 132, and therefore it is possible to take the memo from memo storage 110. In the example shown in FIG. 8 also, URL is used for representing the position of the memo. It goes without saying that any representation format may be used for the position, provided that the position of the memory file can be specified.

The electronic memo includes various memos on various media. The apparatus of the present embodiment handles six different media, that is, graphics, images, motion pictures, sounds, and links to other documents. A memo consists of one or a plurality of these media. In the present embodiment, a memo is stored in memo storage 110. Media constituting the memo is managed by an index file 136 in memo storage 110, as shown in FIG. 6.

Broadly, two types of files exist in memo storage 110. One is the file itself or the substance of the file, inherent to the above described six different media and another is an index file to the file itself. More specifically, a memo may consist of a substantive file of a medium. Alternatively, the memo may include, instead of the substantive file, an index file consisting of an index to the file itself. The use of an index file allows different memos to have indexes to one same file, and therefore one substantive file can be treated as a common file shared by different memos. This saves area for memo storage, and facilitates management of the media.

The index file is in one to one correspondence to the position described in memo information table of memo information 132. More specifically, each "position" in memo information table of memo information 132 represents position (name) of the index file of the corresponding memo.

FIG. 9 shows an example of index file description. The index file shown in FIG. 9 corresponds to "file://memos./008001.mem" given as "position" in FIG. 7, and it includes an index to a substantive file of each medium constituting one memo. Referring to FIG. 9, one index file 136 describes, for each of the media constituting the memo, serial numbers of the memos in the file of each medium constituting the memos, file type, position on the document, range (size) of memo indication, and the name of the substantive file of the memo.

Here, serial number 004 of FIG. 9 is a link not to a substantive file but to other document, and as a file name, place of the document is described. For the substantive file of the memo, general file format may be used, or a unique one may be used.

If a memo consists not of one or a plurality of different media but of only one type of medium, an index file would be unnecessary. In that case, in the memo information table, position of the substantive file of the memo file is directly described, and in the table of memo information 132. type of the memo, position on the document and range are added. Alternatively, one special file format may be employed for "memo", and various information may be put in the file.

Referring to FIG. 10, document-memo correspondence information 134 includes description of a plurality of sets of registration ID, document ID and memo ID in the form of a table. Registration ID is an identification number allotted to a combination of a document and a memo, when a document, a memo or the combination of a document and a memo is first registered in the electronic memo processing apparatus of the present embodiment, and the registration ID is used for management in the system. Document ID is an identification number of a registered document, which is the same as document ID shown in FIG. 7. Memo ID is an identification number of a registered memo, which is in one to one correspondence with memo ID shown in FIG. 8.

Figure 11:
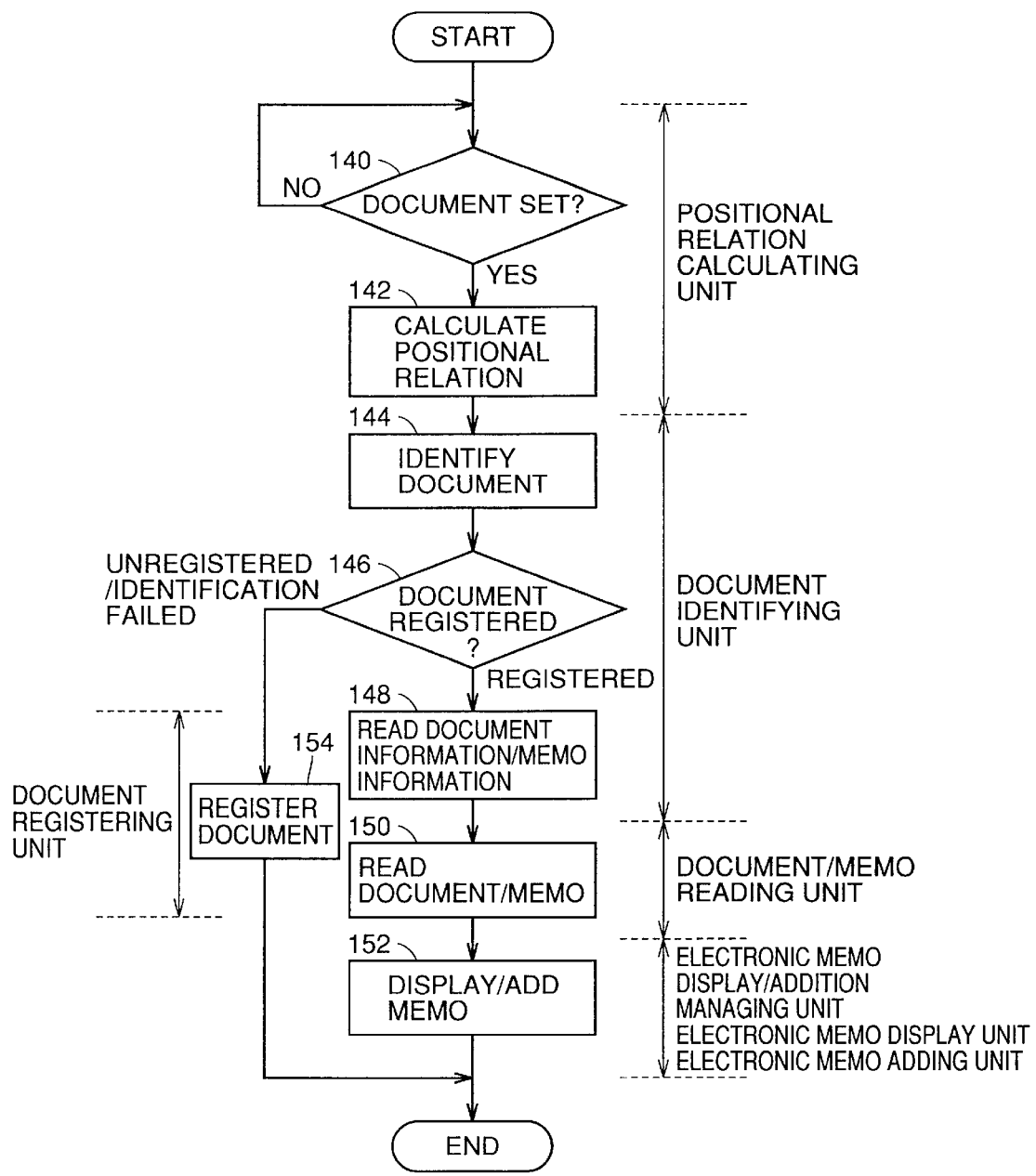
FIG. 11 is a schematic flow chart of the operation of the electronic memo processing apparatus in accordance with the first embodiment.

The operation of the electronic memo processing apparatus in accordance with the first embodiment will be described in detail with reference to the flow chart. FIG. 11 is a flow chart showing an overall operation of electronic memo processing apparatus in accordance with the first embodiment.

Referring to FIG. 11, first, in step 140, position information of document 52 from scanner 62, position of see through display device 68 and position of tablet 66 are acquired by positional relation calculating unit 100, and based on the position information, whether document 52 is set in electronic memo processing apparatus 50 or not is determined. If it is determined that document 52 is set, in step 142, positional relation between electronic memo processing apparatus 50 and document 52 is calculated, also by positional relation calculating unit 100. Various methods are possible for calculation. For example, a prescribed marker may be allotted to a prescribed position of document 52, and scanner 62 reads the marker, whereby positional relation to the document 52 is determined referring to the mark position. A camera may be used to know the position of document 52. In this case, image recognition of the image of document 52 photographed by the camera may be performed, and processes in steps 140 and 142 may be carried out based on the result of image recognition.

In step 140, if it is determined that document 52 is not set, step 140 is repeated.

After the process of step 142, in document identifying unit 116, the set document 52 is identified (step 144). Here, the document ID is attached in advance at an upper right portion of document 52, and scanner 62 reads the code, whereby document identifying unit 116 identifies the document ID. The information attached to the document is not limited to the document ID. In addition to, or in place of the document ID, name of the document, position of the document, registration ID of the document (see FIG. 10) or the like may be used.

Other than the method of attaching necessary information in the form of bar code to the document in advance, various other methods are possible for identifying the document. For example, character recognition technique combined with a search engine may be used for identify the document. In this case, first, the document is scanned by a handy scanner or the like to take the document as an image, and the content of the document is recognized by the character recognition technique. Thereafter, from the content of the document recognized in this manner, a key word is extracted, and the document is specified by a search engine of the computer.

This operation is on the premise that the read document is originally created electronically in some form or other and stored in the electronic memo processing apparatus or at a place accessible therefrom. In place of the search engine of the computer system, an Internet robot for searching document on the Internet may be used for specifying the document.

If the document cannot be identified in step 144 (identification failed), the flow proceeds to the next step.

In the next step 146, in document identifying unit 116, document information 130 and document-memo correspondence information 134 are referred to, in order to determine whether the document identified in step 144 has been registered or not. If the document is unregistered or identification fails, control proceeds to step 154, and if the document has been registered, control proceeds to step 148.

In step 148, following the determination of step 146 that the document has been registered, in document identifying unit 116, registered record corresponding to the identified document is read from document-memo correspondence information table stored in document-memo correspondence information 134. Then, the document record having that document ID which is contained in the registered records is read from the document information table stored in document information 130. Similarly, a memo record having that memo ID which is included in the registered records is read from the memo information table stored in memo information 132.

In step 154, following the determination in step 146 that the document is unregistered or identification failed, document registration unit 116 newly registers the set document. For the new registration, a registration ID and a document ID are newly set, and the document is added as a new record, to document-memo correspondence information 134. At this time, memo ID is set as "none".

Therefore, a new record is added also to document information 130. At the time of addition, there are three different methods, dependent on the situation. The first is employed when the position of the document has been specified by a search engine or the internet robot, in step 144. In this case, a new record including document ID newly attached to the document, position obtained from the result of searching, type of document, author, creation date and update date is added to document information 130. The second is employed when the document cannot be identified but accessible by a computer network, with the position of the document known to the user. In this case, it is requested that the user explicitly designate the position of the file, and a new record including the document ID newly attached to the document, the designated position, document type, author, creation date and update date is added to document information 130. The third is employed when the situation is other than the two described above. This method is also employed when the document is manually written. In that case, the document is scanned by a scanner, and taken in document storage 112 of the apparatus. At the same time, a new record including the document ID newly attached to the document, newly stored position, type of document, author, creation date and update date which are newly generated, is added to document information 130. Here, the document to be stored in document storage 112 may be the image itself obtained by scanning, or it may be converted to text data utilizing character recognition technique.

Document registration unit 118 also has a function of newly registering a document created by using a document creation application 120. The function may be implemented in the form of a plug-in module to document creation application. By executing the plug-in module in the document creation application 120, the document being created can be registered to document information 130.

Again referring to FIG. 11, in step 150, at document/memo reading unit 106, document record read from document information 130 and memo record read from memo information 132 in step 148 are referred to, and the substance of the document is read from document storage 112, and an index file and the substance of the necessary memo are read from memo storage 110. Here, the substance of the document includes layout information. Document/memo reading unit 106 analyzes layout information particular to the document creation application software. The substance of the memo may be read only when display by the electronic memo display unit 102 is necessary. This approach is effective when temporary storage of the apparatus has small capacity.

Step 152 is a memo display/addition step in which the process of displaying/adding a memo is performed based on interaction with the user, at electronic memo display/addition managing unit 104, electronic memo display unit 102 and electronic memo adding unit 108. The operation in memo display/addition step 152 will be described in detail with reference to the flow charts of FIGS. 12 to 14.

Figure 12:
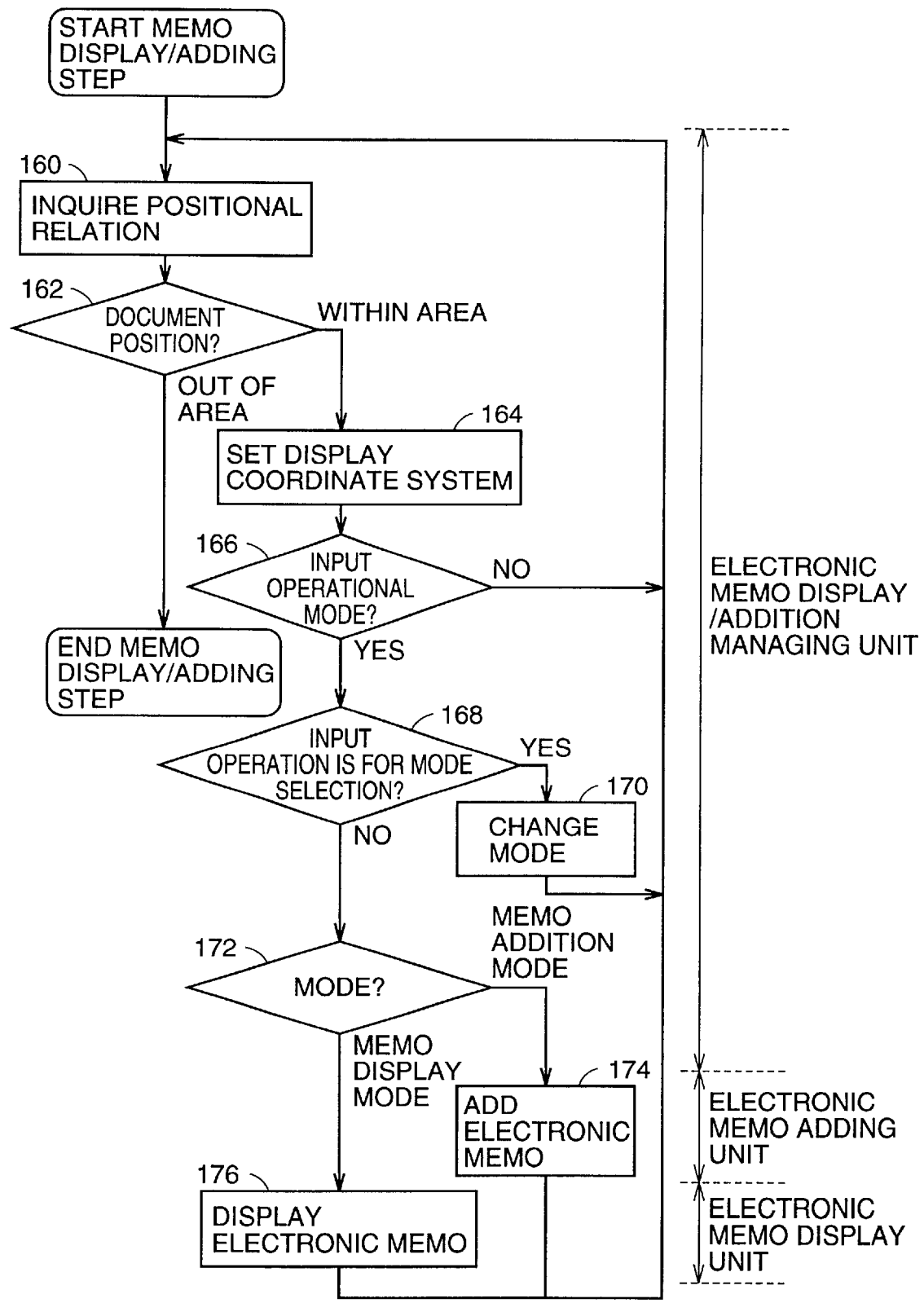
FIG. 12 is a flow chart related to the step of adding an electronic memo and the step of displaying the electronic memo, in the operation of the electronic memo processing apparatus in accordance with the first embodiment.

FIG. 12 is a flow chart schematically showing the operation of memo display/addition step 152 of FIG. 11, mainly focused on the operation at electronic memo display/addition managing unit 104.

First, in step 160, inquiries about the current positional relation between each of the display device, the input device and the document are sent to the positional relation calculating unit, and the position of the document is determined in step 162. When the document goes out of the display area of the display apparatus, the step of memo display/addition is terminated, and if the document is within the area, the control proceeds to step 164.

In step 164, a display coordinate system is set, based on the positional relation obtained in step 160. This is a process for maintaining the positional relation between the virtual electronic memo display sheet and an electronic memo adding sheet displayed on the display device, with a paper document. When the position of display of the document is offset, the display on the display sheet is also offset by the same amount due to this process, and therefore positional consistency between the document and the display is maintained.

In step 166, whether there is an input by the user through tablet 66 or not is determined. If there is an input, the control proceeds to step 168 and otherwise, the control returns to step 160.

In step 168, whether the input at step 166 is mode selection or not is determined. The operational mode includes a memo display mode and a memo addition mode. If the input is a mode selection input, the control proceeds to step 170 where the operation is switched to the mode selected by the user, and the control returns to step 160. If the input is not the mode selection input, the control proceeds to step 172. The mode selection input may be realized by providing a hardware switch in the system configuration shown in FIGS. 1 to 6. Alternatively, the mode selection input may be realized by a mode selection button displayed on the display device through GUI (Graphical User Interface). When GUI is employed, GUI parts displayed on the display device may be adapted to be overlapped on the document, so that the button is viewed as if it is on the paper document.

In step 172, currently set mode is determined. If it is the memo display mode, the control proceeds to electronic memo display step 176, and if it is the memo addition mode, the control proceeds to electronic memo adding step 174.

Figure 13:
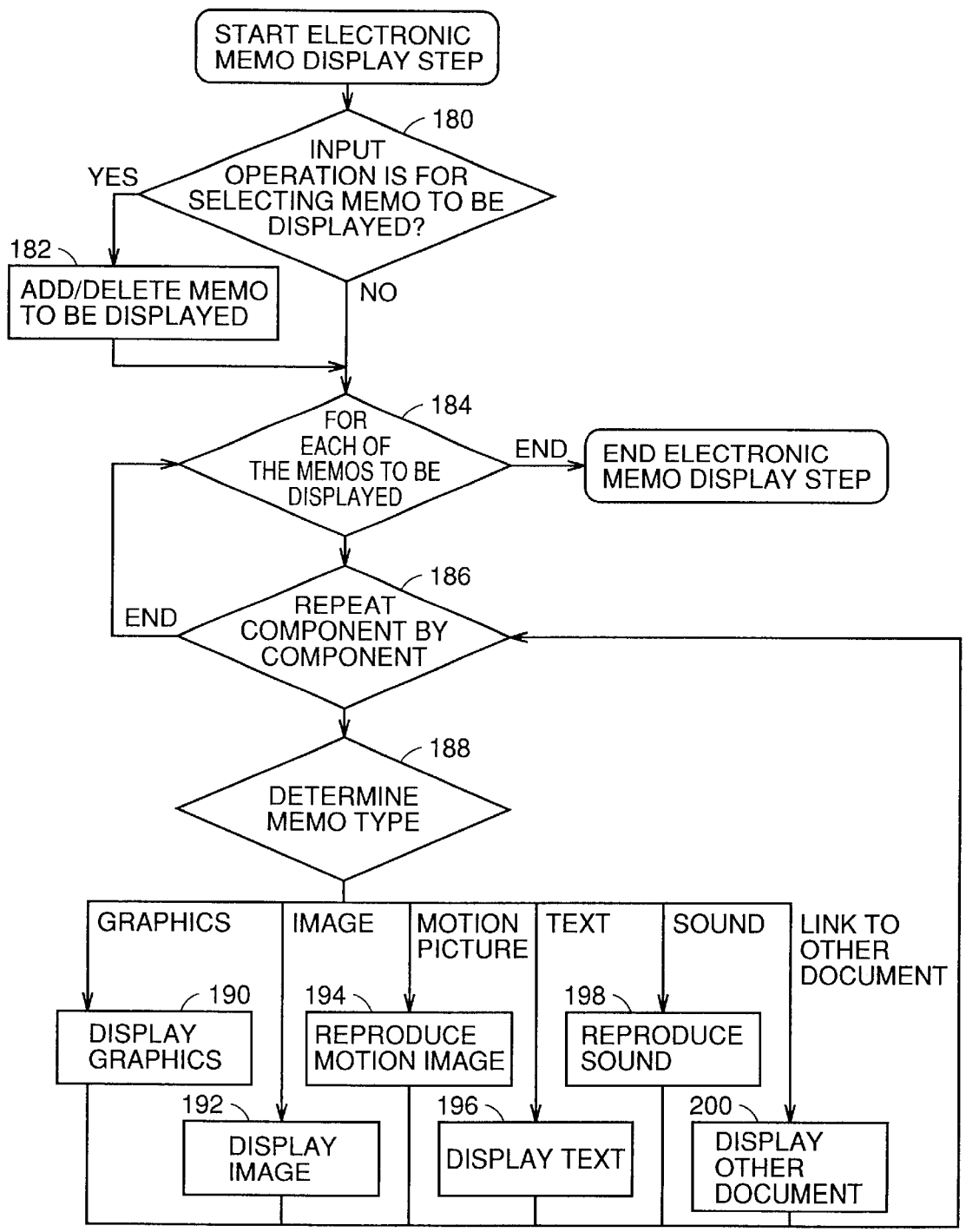
FIG. 13 is a flow chart related to the step of displaying electronic memo in the operation of the electronic memo processing apparatus in accordance with the first embodiment.

FIG. 13 is a flow chart showing in detail the electronic memo display step 176. The process of electronic memo display step 176 takes place in electronic memo display unit 102.

First, in step 180, whether the input operation input by the user in step 166 of FIG. 12 is an input for selecting a memo to be displayed or not is determined. If the input operation is not the input for selecting the memo to be displayed, the control proceeds to step 184. If the input operation is an input for selecting a memo to be displayed, the flow proceeds to step 182 where the memo to be displayed is added or deleted, and thereafter the control proceeds to step 184. As to the method of inputting selection of a memo to be displayed, a button of every memo added to the document may be prepared and selected through GUI, or the user may select the position where the memo supposed to exist by means of an input device. The latter method is performed referring to the range and position on the document of the memo described in the index file shown in FIG. 7. A default memo to be displayed may be prepared and given as an initial display.

Step 184 is for repeating the following steps, on each of the selected memos to be displayed. When a series of repetition processes are completed, the control goes out of the electronic memo display step, and returns to step 160 of FIG. 12.

Step 186 is for repeating the following steps for each component of the memo to be displayed, and when a series of repetition processes are completed, the flow returns to step 184.

In step 188, type of the memo is determined, referring to the memo types described in the index file of the memos shown in FIG. 9. If the type of the memo is graphics, then the control proceeds to the graphic display step 190. If it is an image, the control proceeds to an image display step 192, if it is a motion picture, to a motion picture reproduction step 194, if it is a text, to a text display step 196, if it is sound, to a sound reproduction step 198 and if it is a link to other document, then the control proceeds to other document display step 200.

In each of the steps 190 to 200, contents of the memo are analyzed, and converted to a form allowing display/reproduction on the display device. The memo is drawn on a virtual electronic memo display sheet. Here, if the substantive file of the memo is in a general format, the memo may be displayed/reproduced by activating the dedicated application. The user views the document through the display device where the electronic memo display sheet is displayed, and therefore the document and the displayed memo appear overlapped with each other, and therefore the user has a feeling as if the memo is directly written on the document.

Figure 14:
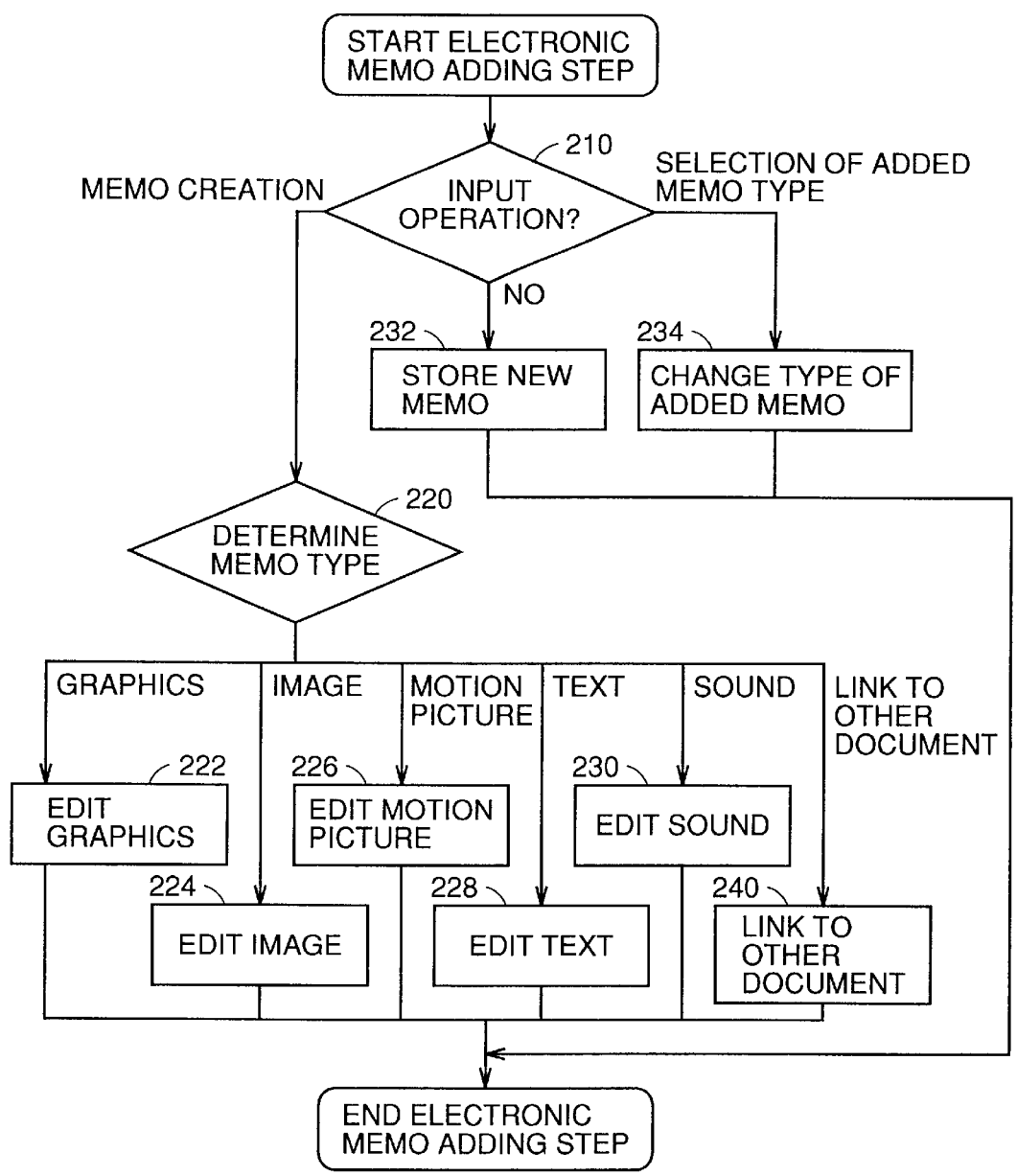
FIG. 14 is a flow chart related to the step of adding the electronic memo in the electronic memo processing apparatus in accordance with the first embodiment.

FIG. 14 is a flow chart showing in detail the electronic memo adding step 174. The electronic memo adding step 174 takes place in electronic memo adding unit 108.

First, in step 210, an input operation by the user in step 166 of FIG. 12 is determined. If the input operation is an input for creating a memo, the control proceeds to step 220. If it is an input for storing a memo, the control proceeds to 232. If it is an input for selecting type of a memo to be added, the control proceeds to step 234 where the type of the memo to be added is changed. The input for selecting type of the memo to be added and the input for storing the memo are performed by a method of preparing and selecting buttons for every memos added to the document, through GUI. As to the input for creating a memo, any input operation other than those mentioned above may be regarded as the input for creating a memo.

In step 220, the type of the memo to be added is determined. If the type of the memo is graphics, the control proceeds to a graphic editing step 226, if it is text, to a text editing step 228, if it is sound, to a sound editing step 230, and if it is a link to other document, the control proceeds to other document linking step 232.

In each of the steps 220 to 232, edition of respective types of memos, that is, respective media is performed. Edition of the memo is performed on the virtual memo adding sheet displayed on the display device. Therefore, the user adds the memo in a manner as if he or she directly draws the memo on the document which is viewed through the display device. More specifically, edition can be done in a manner as if a line, an arrow, or characters are directly written on the document. Here, an editor unique to respective media may be prepared. If the substance of the memo is in a general format, for example, then an edition application dedicated therefor may be activated. Alternatively, a memo which is being created may be related to a memo created before. For this purpose, a method providing a mechanism for allowing the user to explicitly relate, a method of relating referring to positional relation of the memos, a method of automatically relating a memo displayed during a new memo is being edited, may be possible.

In steps 222 to 232, when the process for the input operation of step 166 of FIG. 12 is completed, the control returns to step 160 of FIG. 12.

In step 232, new storage of the edited memo, that is, registration is done. A memo ID is newly attached to the memo which has been edited, and a corresponding record is added to the document-memo correspondence information table of document-memo correspondence information 134 and to the memo information table of memo information 132. Further, a new index file such as shown in FIG. 7 is generated, and the index file and the substance of the memo are stored in memo storage 110.

In this manner, it becomes possible to relate, on a computer, a document on a paper medium and an electronic memo related to the document, to display the memo on the document, and to input an electronic memo to the computer by manually writing the memo overlapped with the document.

As is apparent from the foregoing, according to the first embodiment, electronic memo writing and memo reference are possible while convenience of a paper medium is maintained, and integrated management of the document and the memo can easily be attained.

Second Embodiment

Figure 15:
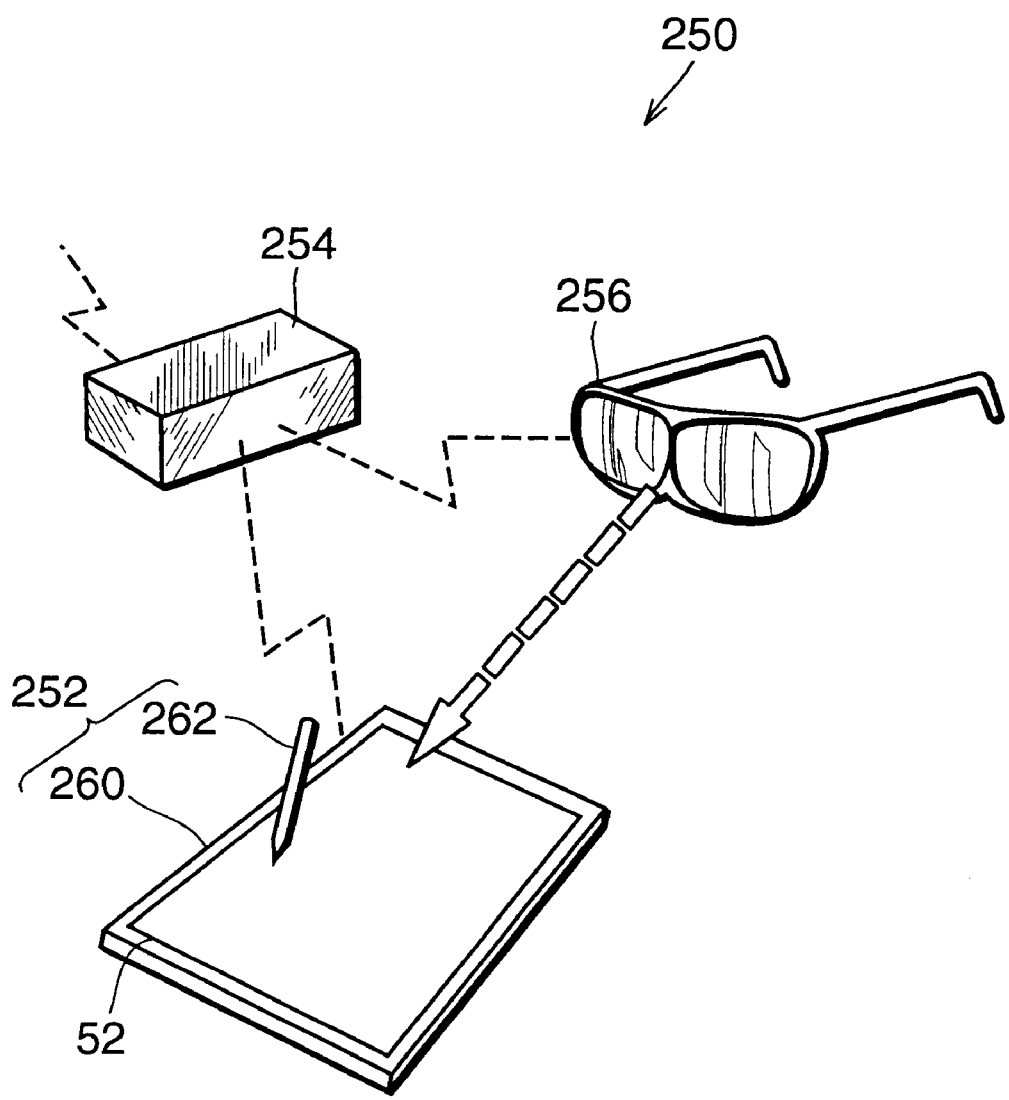
FIG. 15 is an illustration schematically showing the electronic memo processing apparatus in accordance with a second embodiment of the present invention.

FIG. 15 schematically shows an electronic memo processing apparatus in accordance with a second embodiment of the present invention. Referring to FIG. 15, electronic memo processing apparatus 250 includes a binocular type see through display device 256 displaying, when a user wears the device, a memo on the user's field of view, an input device 252 including a pen 262 allowing the user for an input operation and a tablet 260 on which paper document 52 is placed, and a control device 254 controlling electronic memo processing apparatus 250 in accordance with the present invention.

Though control device 254, binocular type see through display device 256 and input device 252 are shown separate from each other in FIG. 15, the configuration of the present invention is not limited thereto. For example, control device 254 may be contained as a whole or partially in the binocular type see through display device 256 or input device 252, or contained in both of these devices.

In the configuration of FIG. 15, when document 52 is placed on the tablet and the user views document 52 through binocular type see through display device 256, it is possible for the user to view the paper document and the displayed content displayed on the binocular type see through display device 256. Further, an arbitrary position on the paper document can be pointed by input device 252, and therefore an operation of writing an electronic memo is possible.

Figure 16:
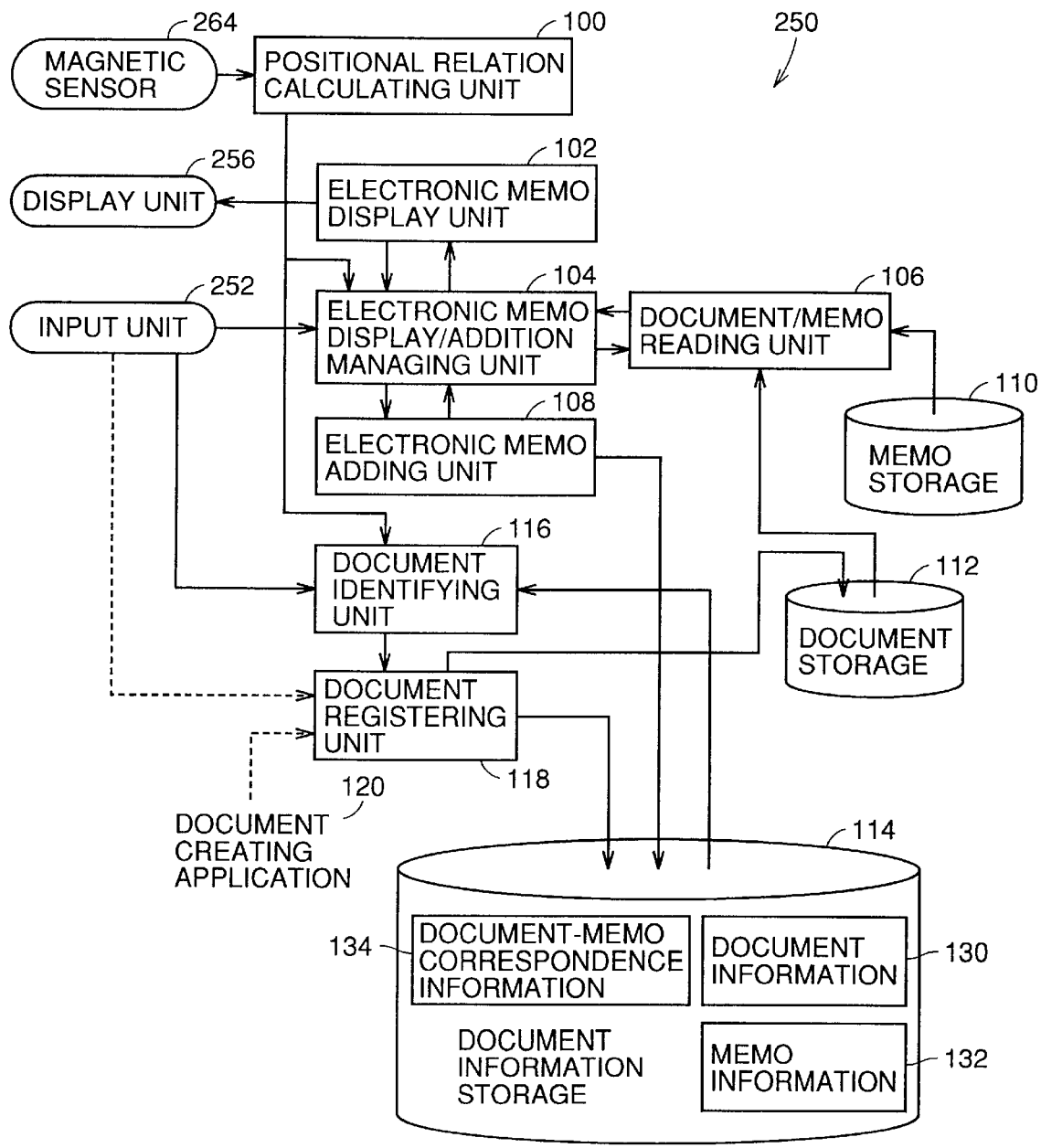
FIG. 16 is a schematic functional block diagram of the electronic memo processing apparatus in accordance with the second embodiment of the present invention.

FIG. 16 is a functional block diagram of the electronic memo processing apparatus 250 in accordance with the second embodiment. Referring to FIG. 16, electronic memo processing apparatus 250 is different from electronic memo processing apparatus 50 of the first embodiment shown in FIG. 6 in that in place of scanner 62 shown in FIG. 6, a magnetic sensor 264 is provided for obtaining information representing spatial positional relation between binocular type see through display device 256 and the tablet 260 or document 52, that in place of see through display device 68 of FIG. 6, binocular type see through display device 256 is provided, and that in place of tablet 66 of FIG. 6, input device 252 is provided. In electronic memo processing apparatus 250, a camera may be used for identifying identification information on document 52.

Electronic memo processing apparatus 250 operates in the similar manner as the first embodiment except that a signal from magnetic sensor 264 is used for obtaining position information of document 52 and that binocular type see through display device 256 is used for displaying the memo overlapped on document 52. Therefore, detailed description thereof is not repeated here. By the electronic memo processing apparatus 250 of the second embodiment also, it is possible to integrally manage a paper document and an electronic memo added to the document, in the similar manner as the first embodiment.

Third Embodiment

Figure 17:
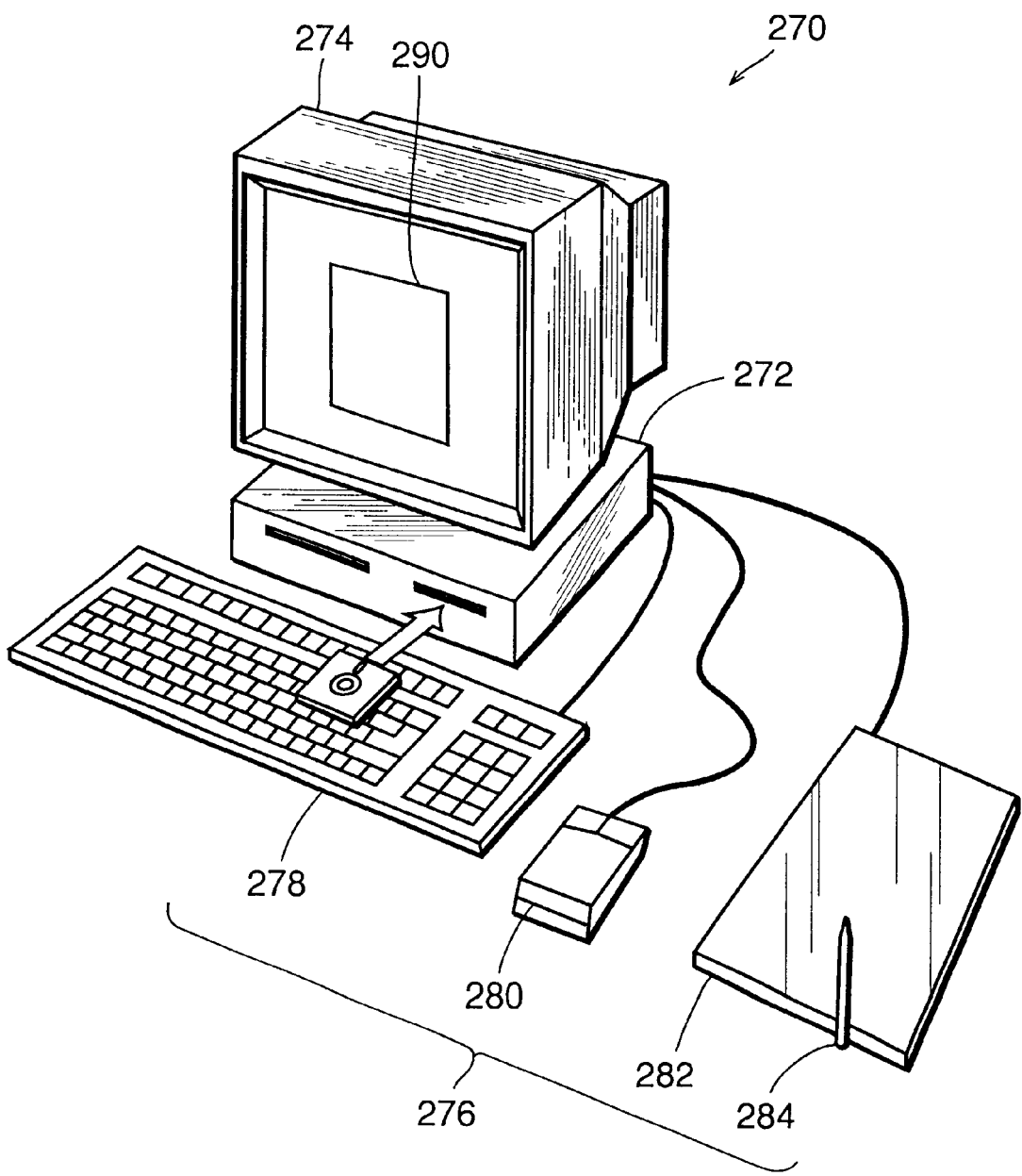
FIG. 17 schematically shows an electronic memo processing apparatus in accordance with a third embodiment.

FIG. 17 shows schematic configuration of the system in accordance with a third embodiment of the present invention. The system is an implementation of the electronic memo processing apparatus in a common computer system 270. Here, not a document printed on paper medium but a document 290 stored electronically is displayed on the display device, and electronic memo is further added to document 290.

Referring to FIG. 17, computer system 270 includes a monitor device 274 on which document 290 and a memo, not shown, are displayed, an input device 276 allowing a user to input, and a computer body 272 controlling the system in accordance with the present invention. In the example shown in FIG. 17, input device 276 includes a keyboard 278, a mouse 280, a tablet 282 and a pen 284. Other pointing device may be used as input device 276.

In the third embodiment shown in FIG. 17, document 290 is displayed on monitor device 274 by a computer application program or the like, and the electronically added memo is displayed overlapped with the document, in a semi-transparent form, as a function of the system itself. Operation such as electronic memo writing can be performed by the user, by pointing an arbitrary position on document 290 through input device 276.

Functional configuration of the system in accordance with the third embodiment shown in FIG. 17 is similar to that of the first or second embodiment, except that the document is displayed on monitor device 274. Therefore, detailed description thereof is not repeated here.

In any of the first to third embodiments described above, the apparatus is configured by a single system. It is preferred, however, that a plurality of systems are connected by a network, when any of the embodiments is implemented. Network connection remarkably increases the number of object documents, and by the portability of the system, it becomes possible to conveniently use the system on the way.

Fourth Embodiment

An electronic memo processing apparatus mainly focused on easy addition or display of an electronic memo on the document even by a user not accustomed to computer operation will be described.

Figure 18:
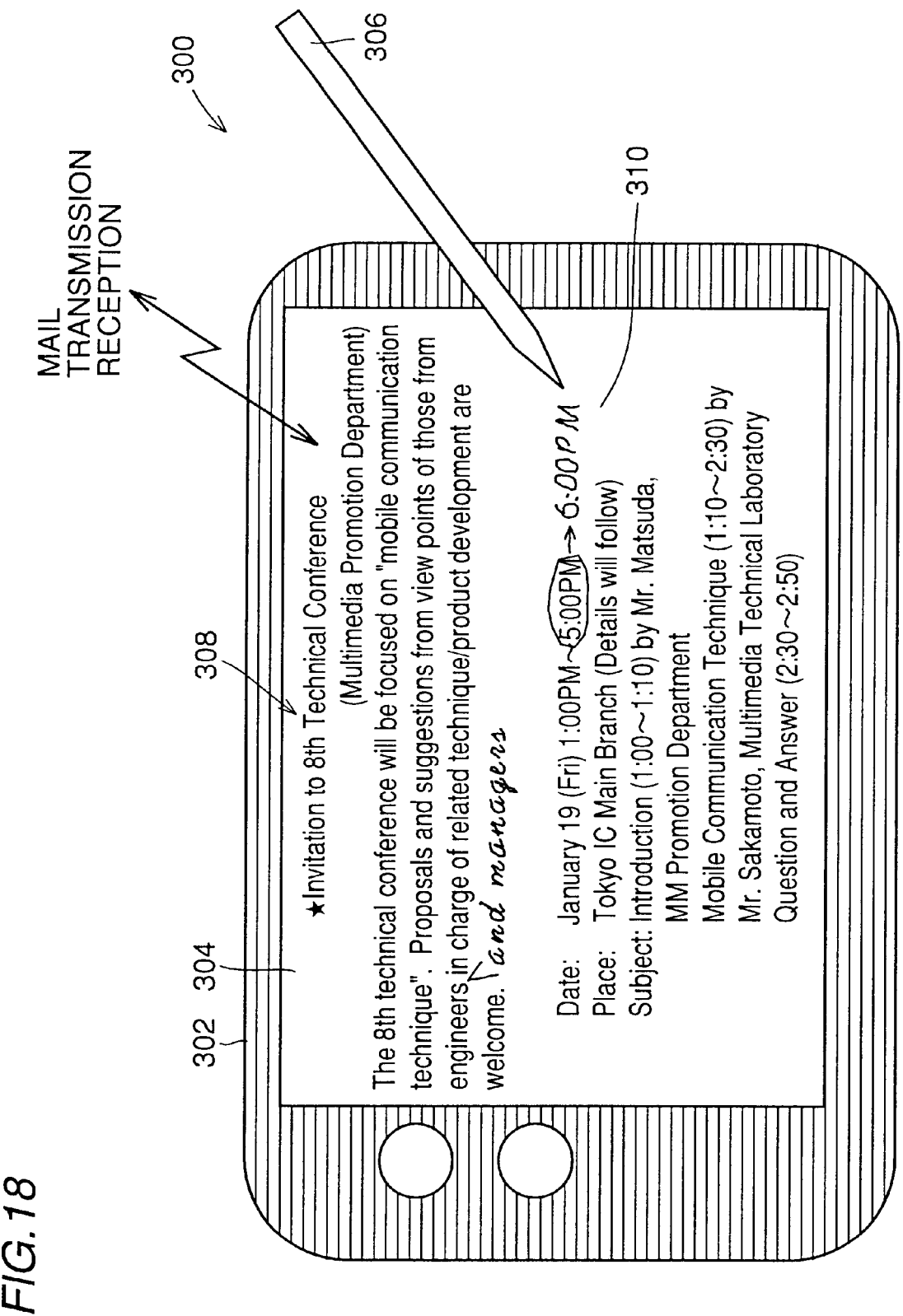
FIG. 18 is a plan view showing appearance of an electronic memo processing apparatus in accordance with a fourth embodiment.

FIG. 18 schematically shows an appearance of a portable computer 300, which is an electronic memo processing apparatus in accordance with the fourth embodiment of the present invention. Referring to FIG. 18, the portable computer 300 includes a body 302, an input unit 304 with integrated display provided on an upper surface of body 302, and a pen 306 allowing manual input by the user to the input unit 304 with integrated display. In portable computer 300, a document file image 308 is displayed on input unit 304 with integrated display, addition of a memo to the document through pen 306 is allowed, and a memo added to the document is adapted to be displayed on input unit 304 with integrated display, overlapped with document file image 308. The feature of the apparatus is, among others, that the system itself implements a function of adding or displaying the memo to any document, separate from the application for creating the document.

Figure 19:
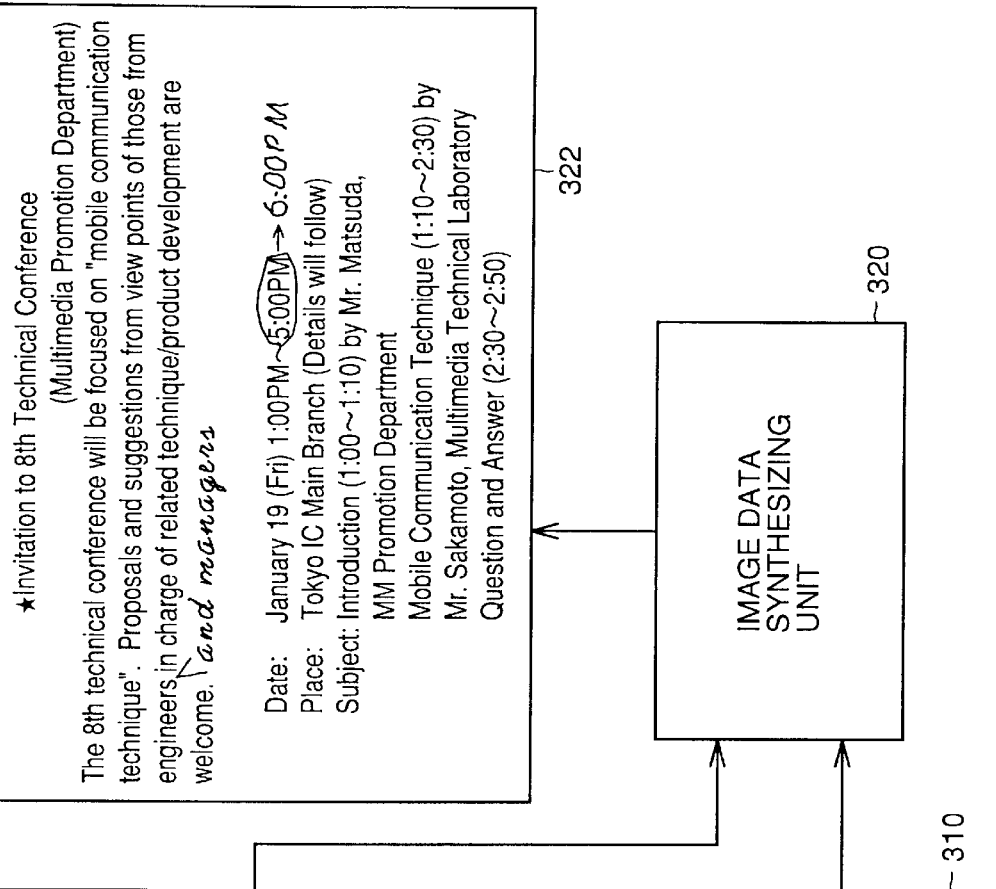
FIG. 19 is an illustration representing synthesization of a document file image and a pen track image in the electronic memo processing apparatus in accordance with the fourth embodiment.

For this purpose, portable computer 300 adapts the following method. Referring to FIG. 19, for a document created by an application program, the system controls the application program to create a document file image 308 of the document. The system allows storage and searching of an image of a manually written memo 310 separate from document file image 308, and by image data synthesizer 320, the image of manually written memo 310 is superposed on document file image 308, and the thus synthesized image 322 is displayed.

In image data synthesizer 320, pixels of document file image 308 and pixels of the image of hand written memo 310 are read, scanned successively starting from an upper left corner of the images, and exclusive OR of pixels is calculated and output. In this manner, document file image 308 and the image of hand written memo 310 can be synthesized.

Apparatus configuration and method for implementing the above described scheme will be described in the following.

Figure 20:
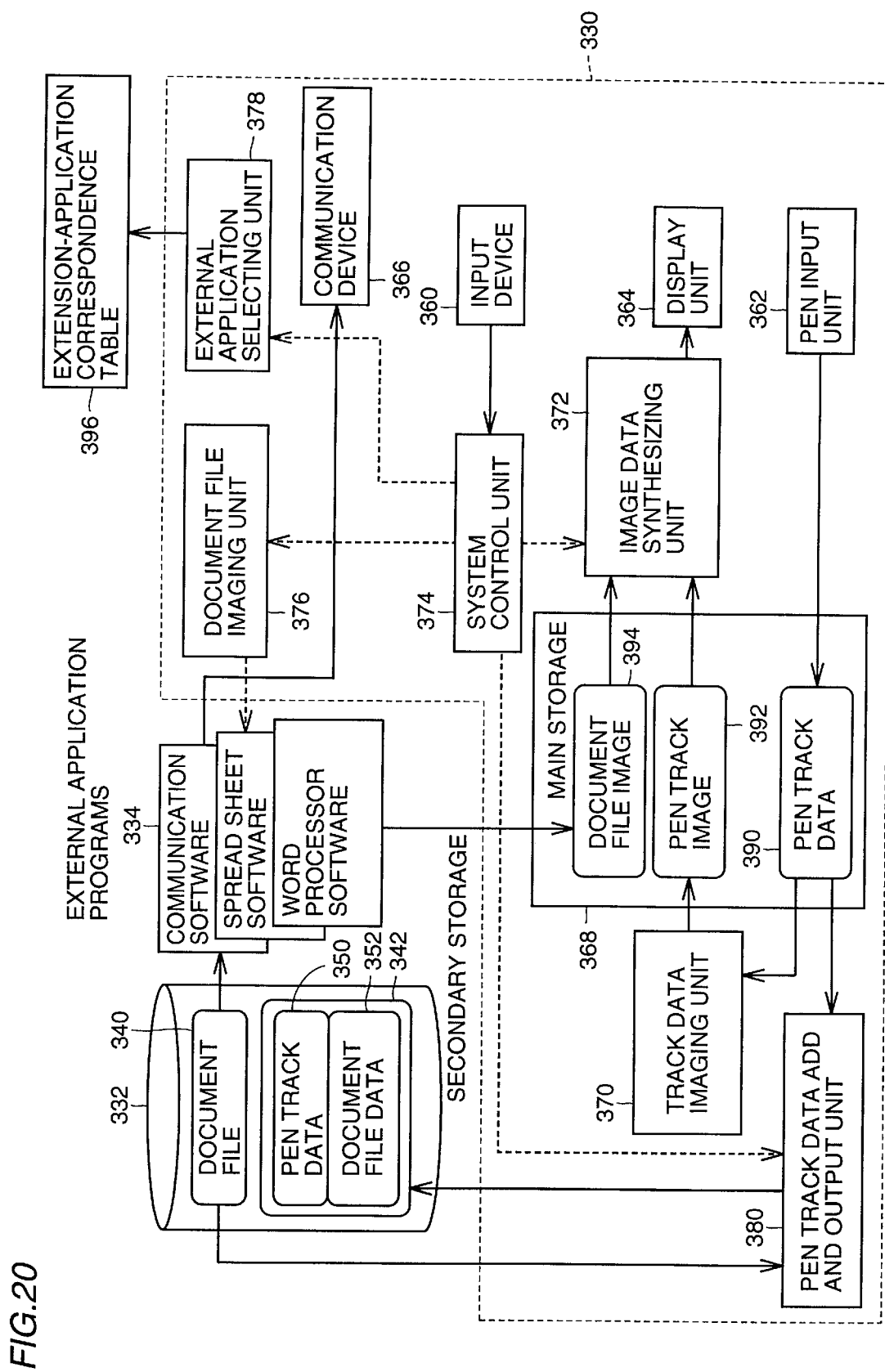
FIG. 20 is a functional block diagram showing configuration of the electronic memo processing apparatus in accordance with the fourth embodiment.

Referring to FIG. 20, the portable computer 300 in accordance with the fourth embodiment includes an electronic memo processing apparatus 330, a secondary storage 332 and various software 334.

Secondary storage 332 stores document file 340 and a document file 342 to which pen track data has been added. Document file 342 with pen track data added includes a document file data 352 of the same type as document file 340, and pen track data 350.

Various software 334 includes external application programs including a word processor software, a presentation software, a spreadsheet software, a mail software and so on. It is necessary that the application program used in the electronic memo processing apparatus in accordance with the present embodiment is externally operable. An API (Application Programming Interface) function, a message communication or occurrence of an event may be utilized as means for operating the application program externally.

Electronic memo processing apparatus 330 includes: an input device 360 for a user to input an instruction to the system; a pen input unit 362 for the user to input hand written data; a display unit 364 displaying the document file image and the pen track data; an external application selecting unit 378 for selecting an application corresponding to the document file, referring to an extension-application correspondence table 396; a system control unit 374 for overall control of electronic memo processing apparatus 330; a communication device 366; a document file imaging unit 376 for generating a document file image 394 of the document file, by controlling the external application program; an image data synthesizing unit for generating an image of pen track image 392 and document file image 394 superposed, and outputting the synthesized image to display unit 364; a main storage 368 for storing document file image 394 generated by the application program, the pen track data 390 input by the user through the input device, and so on; a track data imaging unit 370 for outputting hand written stroke data input by the user through an input unit 362 to an area of main storage 368 in the form of bit map format (collection of pixels); and pen track data addition and output unit 380 for adding pen track data 350 to document file data 352.

Figures 21, 22:
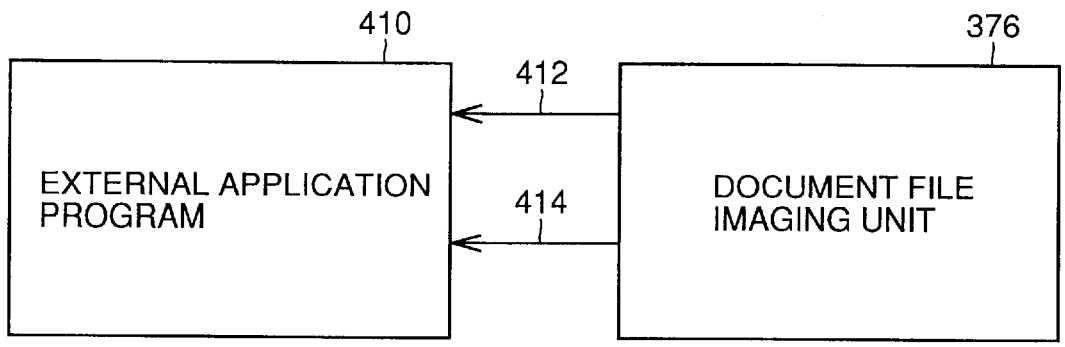
FIG. 21 is an extension-application correspondence table.
FIG. 22 shows operation of an external application by a document file imaging unit.

Extension-application correspondence table 369 records, in the form of a table, names of applications and file paths 404 for the respective applications, for each of the extension 400 of the files, as shown in FIG. 21.

Input device 360 may be a keyboard or a mouse. The input device 360 may be shared with pen input unit 362.

What is required of pen input unit 362 is that it allows input of track data by handwriting. Therefore, the pen input unit may be a track ball or a mouse. When pen input unit 362 and display unit 364 are implemented, however, by using a tablet with integrated input/output having pen input function, higher operability and portability are ensured conveniently.

Display unit 364 may be a CRT (Cathode Ray Tube) monitor or a liquid crystal display. When the display function of the tablet with integrated input/output having the pen input function mentioned above is used as display unit 364, higher operability and portability are ensured conveniently.

Selection of an application program by external application selecting unit 378 is performed by searching the extension-application correspondence table 396 using an extension of the object file as a key, so as to find the corresponding application of the said extension. Other than this method, a heading portion of the document file may be checked, type of the document file is determined from the data pattern, and the application may be selected, as a possible method of selecting the external application.

Referring to FIG. 22, operation of document file imaging unit 376 will be described. Document file imaging unit 376 activates an external application program 410 selected by external application selecting unit 378 (412). Thereafter, using the file path of the document file to be processed and an address of a document file drawing buffer for drawing the image of the document file as parameters, an instruction is given (414) to the activated external application program 410, so that the image of the document file is output to the document file drawing buffer. Document file drawing buffer is an area secured by document file imaging unit 376 in main storage 368.

Figure 23:
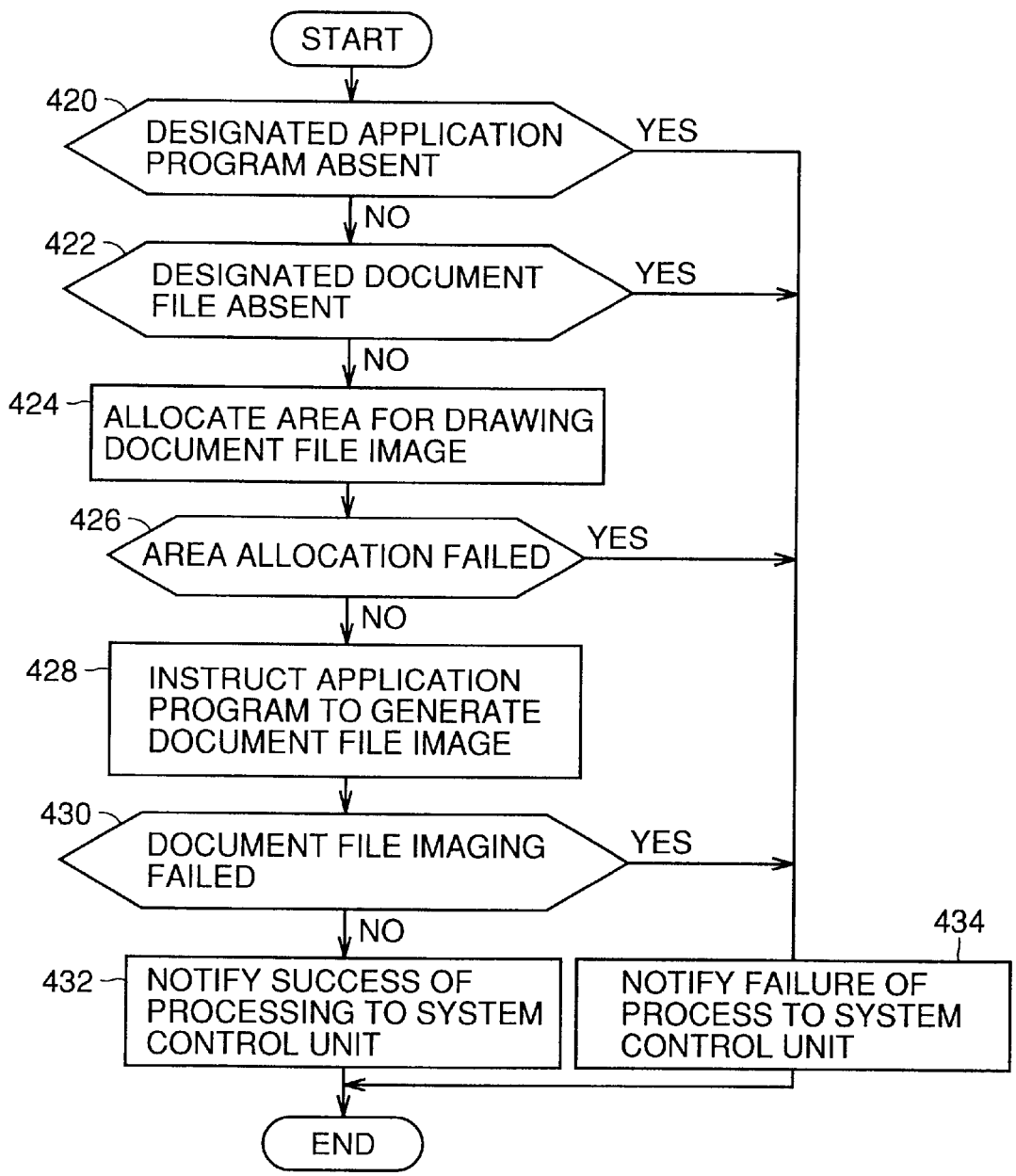
FIG. 23 is a flow chart illustrating a process performed by the document file imaging unit.

The process performed by the document file imaging unit 376 will be described with reference to the flow chart of FIG. 23. First, whether there is the application program selected by external application selecting unit 378 is determined (420). If not, a notice is given (434) informing the system control unit of the fact that the process failed, and the flow is terminated. If there is the application program, then whether the document file to be processed exists or not is determined (422). If the document file does not exist, a notice is given (434) to the system control unit indicating that the process failed, and the control is terminated. Thereafter, a buffer for drawing the document file image is allocated on main storage 368 (424). If the area cannot be allocated, a notice is given (434) to the system control unit informing that the process failed, and the control is terminated. If the buffer is allocated, a path for the document file and an address for the buffer are designated as parameters, to the application program, and an instruction is given to the application program to generate the document file image (428). As for the method of sending the instruction to the application program, an API function may be called, or an occurrence of event may be utilized, as described above. If the application program fails to generate the document file image (430), process failure is notified to the system control device (434), and the control is terminated. If the document file image is successfully generated, success of the process is notified to the system control unit, and the control is terminated (432). Communication between the application program and the document file imaging unit 376 may be realized by calling API function, or by message exchange. The best method to be adapted depends on the type of the OS (Operating System) used.

In the present embodiment, the pen track data input through pen input unit 362 is stroke data. Therefore, in order to display the data on the screen, track data imaging unit 370 is indispensable. When the pen track data input through the pen input unit is image data in the bit map format, however, the track data imaging unit 370 is unnecessary.

Image data synthesizing unit 372 generates an image by superimposing pen track image 392 and document file image 394, and outputs the generated image to display unit 364. This operation has already been described with reference to FIG. 19.

Figure 24:
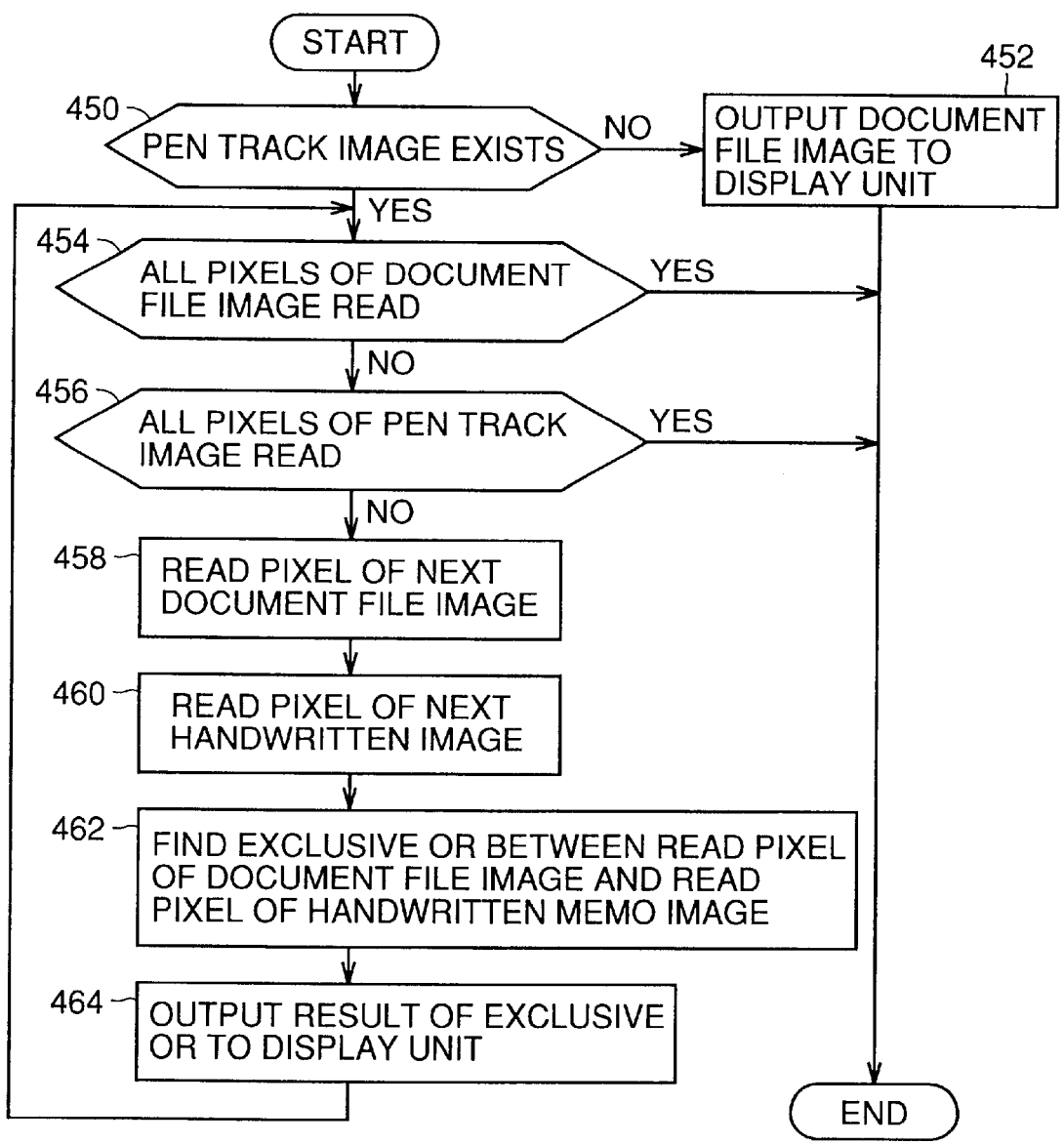
FIG. 24 is a flow chart illustrating the image synthesizing process.

Referring to FIG. 24, the process of image synthesization executed by image data synthesizing unit 372 will be described. First, whether there is a pen track image or not is determined (450). If the pen track image does not exist, the document file image is output as it is to the display unit (452), and the control is terminated. Before the user inputs the pen track data, the pen track image does not exist. Therefore, the flow goes through this procedure at least once at the start.

The process when there is the pen track data will be described with reference to the figure. If processing of all pixels in the document file image has been completed, the control is terminated (454). The control is terminated also when processing of all pixels of the pen track image has been completed (456). Here, it is assumed that the pen track image and the document file image contain the same number of pixels. Therefore, depending on situation, only one determination in step 454 or 456 may be necessary.

If the determination is "NO" in both steps 454 and 456, then one pixel of the document file image is read (458). Thereafter, one pixel of the pen track image is read (460). An exclusive OR between the pixel of the document file image and the pixel of the pen track image read in this manner is calculated (462). The calculated exclusive OR is output to display unit 364 (464). This procedure is continued while scanning the document file image and the pen track image starting from the upper left portion to the lower right portion (until the determination of step 454 or 456 is turned to "YES"), whereby a synthesize image is provided.

Figure 25:
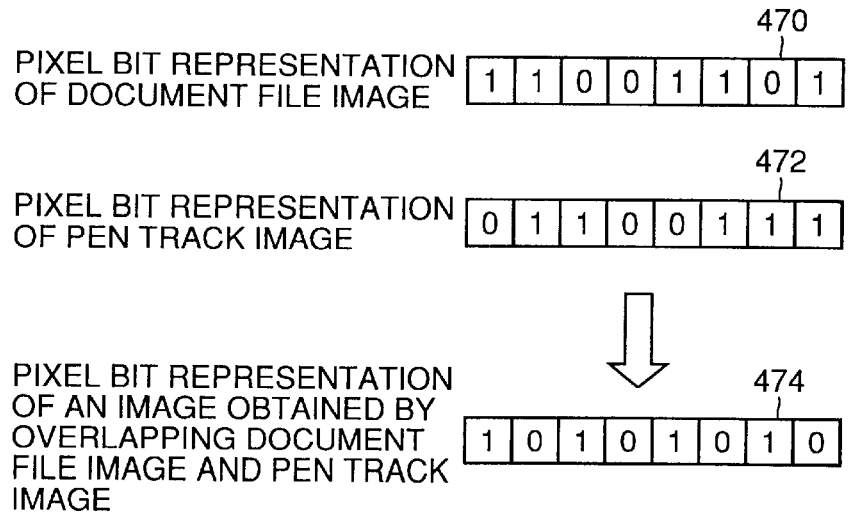

FIG. 25 shows an example of calculation of exclusive OR between pixel data. FIG. 25 shows pixel bit representation 470 of the document file image, and pixel bit representation 472 of the pen track image. Here, it is assumed that one pixel has a depth of 8 bits. When an exclusive OR of two pixel data is obtained, a bit representation 474 after synthesization where the document file image and the handwritten memo image are superposed, is generated. As the exclusive OR is used, except when one image consist exclusively of "1" and the other consist exclusively of "0", the synthesized data is different from either of the data before synthesization, and therefore images before and after synthesization can be distinguished from each other. Use of exclusive OR for synthesization is only an example. Other logic operation may be performed between the pixels of the document file image and the pixels of the pen track image. Further, a special representation may be realized by other operation.

Figure 26:
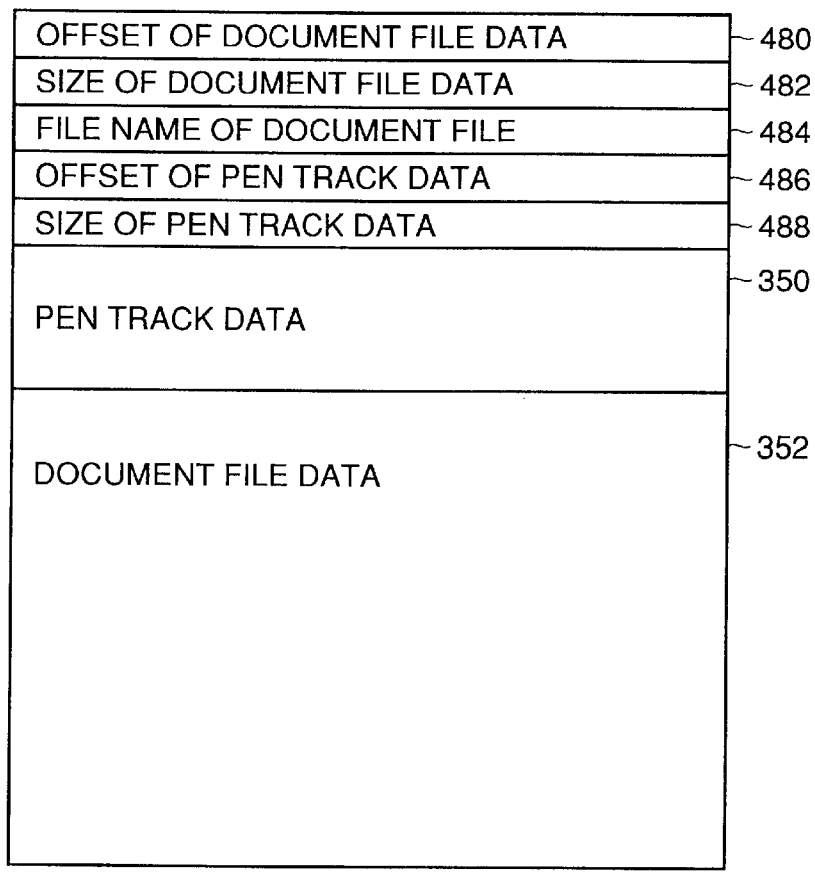
FIG. 26 is an example of a format of a document file with pen track data.

Pen track data adding and outputting unit 380 shown in FIG. 20 couples the pen track data with the document file, and outputs the result as document file 342 with pen track data added thereto. The format of document file 342 with pen track data added, after coupling, is as shown in FIG. 26. Here, it is noted that FIG. 26 shows only an example, and various other formats are possible.

Referring to FIG. 26, document file 342 with pen track data added includes an offset 480 to the document file data, size 482 of the document file data, file name 484 of the document file, offset 486 of the pen track data, size 488 of the pen track data, pen track data 350 and document file data 352.

The offset 480 to the document file data indicates at what byte from the head of the document file 342 with pen track data added, the document file data 352 starts. Size 482 of the document file data represents the length of document file data 352 is in bytes. File name 484 of the document file indicates the document file name of the original document file. Offset 486 of the pen track data is the offset to the pen track data 350, and it indicates what byte from the head of the document file 342 with pen track data added, the pen track data 350 starts. Size 488 of the pen track data represents how many bytes the length of pen track data 350 is in bytes. Document file data 350 stores the content of document file 340 shown in FIG. 20. By outputting the document file 342 with pen track data added in this format, it is readily possible to extract the document file data only from the file, as well as to extract the pen track data only from the file.

Overall operation of portable computer 300 including electronic memo processing apparatus 330 will be described with reference to FIG. 27.

First, a user gives an instruction (500) to system control unit 374 through input device 360 to display a document file, designating a document file name. System control unit 374 passes the file name to external application selecting unit 378 (502). External application selecting unit 378 searches extension-application correspondence table 396 using an extension of the file name as a key, and selects an external application program for processing the document file. External application selecting unit 378 notifies the corresponding external application program name to system control unit 374 (504).

In response, system control unit 374 passes the name of the external application program and the document file name as parameters to document file imaging unit 376 and instructs to image the document file (506). Document file imaging unit 376 activates the external application program selected by external application selecting unit 378, and instructs the external application program to draw image of the document file, designating the document file. The external application program reads the designated document file 340, images the same and outputs the result as document file image 394 to main storage 368 (508).

Thereafter, system control unit 374 instructs image data synthesizing unit 372 to output the document file image 394 to display unit 364 (510). Through these processes described above, document file image 394 is displayed on display unit 364. At this time, document file image 308 shown in FIG. 19 is displayed on display unit 364.

Thereafter, the user inputs the pen track data to be added to the document file, using pen input unit 362 (512). The pen track data 390 is temporarily held in main storage 368, and developed to pen track image 392 by track data imaging unit 370 (514).

System control unit 374 instructs image data synthesizing unit 372 to synthesize and output the document file image 394 and pen track image 392 generated by track data imaging unit 370. In response, image data synthesizing unit 372 synthesizes and outputs the document file image 394 and pen track image 392 to display unit 364 (516). Thus, the display of synthesized image 322 shown in FIG. 19 is obtained.

Here, whether the user instructs termination of the process or not is determined (518). If the user does not instruct to end the process, the control returns to step 512, and input of pen track data is continued. If the user instructs to end the process, the control proceeds to step 520.

In step 520, whether the user instructed registration of the document file with user input handwritten data added or not is determined. If such an instruction has been given, pen track data adding and outputting unit 380 adds the pen track data 390 to the document file, registers the resulting file as document file 342 with pen track data added, in secondary storage 332, and thereafter the control proceeds to terminating process (524), and is terminated. If the user does not designate registration of the document file with the pen track data added, the registration process is skipped, the terminating process (524) is performed and the control is terminated. In the terminating process, areas for the document file image 394, pen track data 390, pen track image 392 and so on ensured on main storage 268 are released.

In the portable computer 300 in accordance with the fourth embodiment, by the function of electronic memo processing apparatus 330, it is possible to add a memo created by handwriting of the user to the document file created by an external application software. The function required of the external application is simply the function of creating a document file image from the document file, and the function of adding the memo is unnecessary. Further, the function of creating a document file image may be prepared and implemented in the form of plug-in, for example, separate from the application itself. Therefore, by the portable computer 300, it is possible to realize the function of adding handwritten memo commonly to a plurality of applications. Here, it is noted that the memo itself is input by handwriting through a pen. Therefore, the memo can readily be provided by a person not good at keyboard operation. Further, as the document file image is displayed, the electronic memo can be added as if the memo is directly written on a sheet of paper. Therefore, the operation is familiar to even those who are accustomed to the conventional method of proof reading and modification.

Fifth Embodiment

Figure 28:
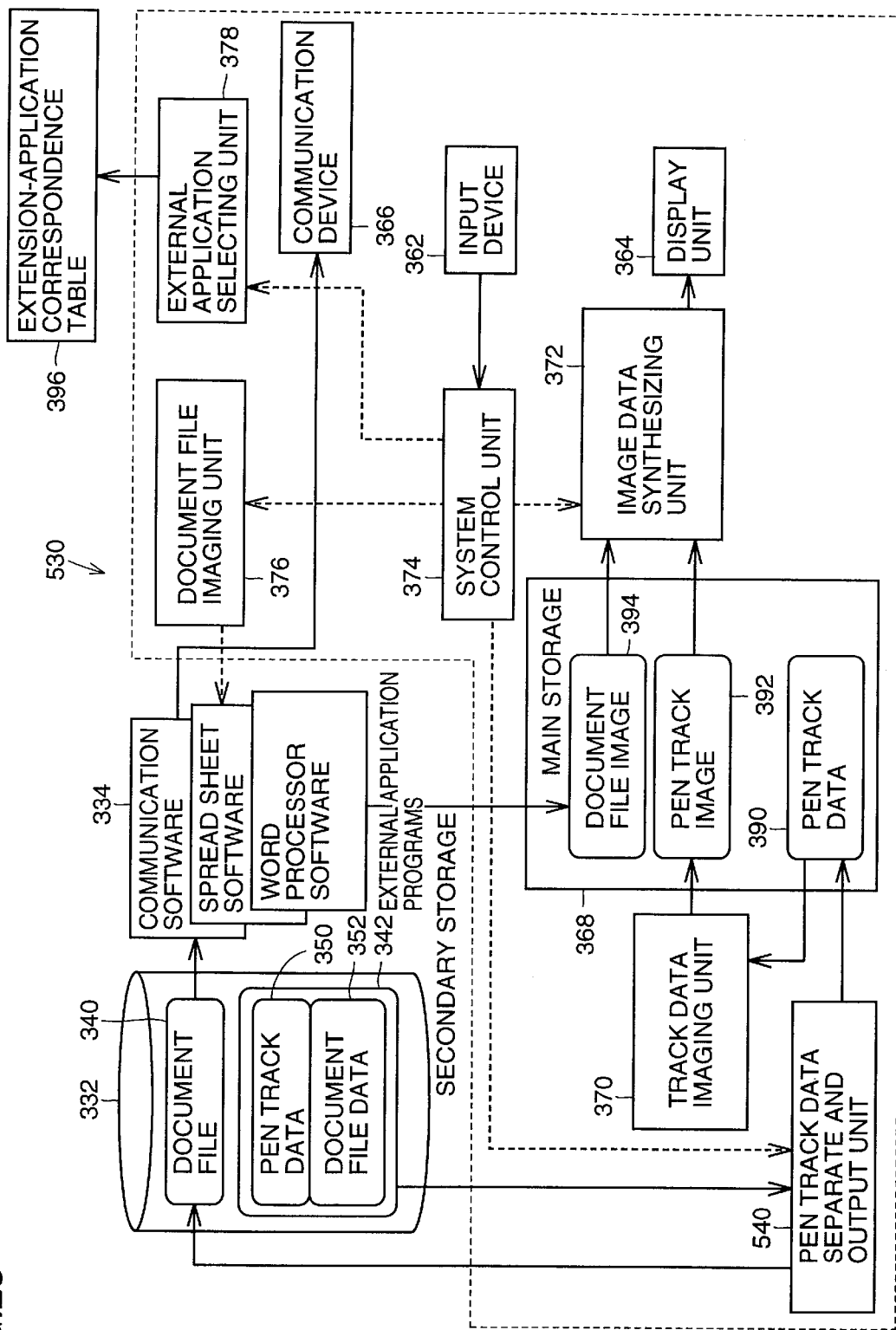
FIG. 28 is a functional block diagram showing configuration of an electronic memo processing apparatus in accordance with a fifth embodiment of the present invention.

The electronic memo processing apparatus in accordance with the fifth embodiment of the present invention will be described. FIG. 28 is a block diagram showing functional configuration of the electronic memo processing apparatus 530 for the document file, in accordance with the fifth embodiment. What is different from FIG. 20 is that pen track data adding and outputting unit 380 of FIG. 20 is replaced by a pen track data separate output unit 540, and that the pen input unit 362 of FIG. 20 is omitted, as it is unnecessary. Except these points, portions of FIG. 28 corresponding to those of FIG. 20 are denoted by the same reference characters. Names and functions of these portions are also the same. Therefore, detailed description thereof is not repeated here.

Pen track data separate output unit 540 is for reading the document file 342 with pen track data added, separating the data to pen track data 390 and document file image 394, and outputting the separated data. As already described, document file 342 with pen track data added has such format as shown in FIG. 26. Pen track data separate and output unit 540 extracts document file data 352, utilizing offset 480 to the document file data and information of size 482 of the document file data, and outputs the extracted data with a file name 484 of the document file, to the secondary storage. Pen track data separate and output unit 540 extracts and outputs pen track data 350, utilizing the information of offset 486 to the pen track data and size 488 of the pen track data.

Figure 29:
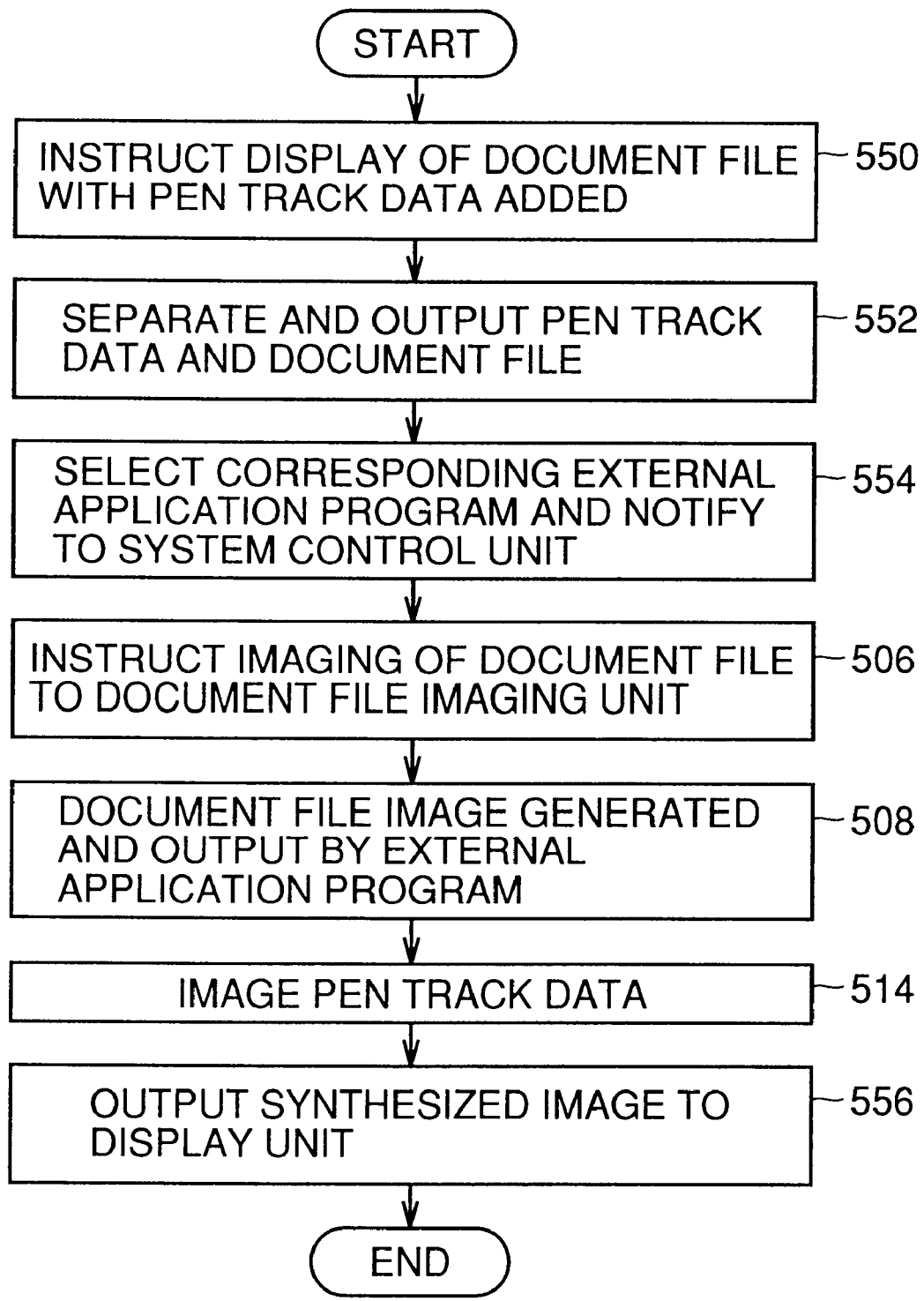
FIG. 29 is a flow chart related to the operation of the electronic memo processing apparatus in accordance with the fifth embodiment of the present invention.

The procedure for displaying the document file 342 with pen track data added will be described with reference to the flow chart of FIG. 29. Here, steps corresponding to those of FIG. 27 are denoted by the same reference numbers.

First, assume that the user designates display of the document file 342 with pen track data added, using input unit 360 of FIG. 28. In response, system control unit 374 instructs pen track data separate and output unit 540 to separate and output the document file and the pen track data 390 from the document file 342 with pen track data added. Further, pen track data separate and output unit 540 passes the file name 484 (FIG. 26) of the document file to system control unit 374 (552).

System control unit 374 passes the file name 484 of the document file to external application selecting unit 378, so that the selecting unit selects an external application for processing the document file (554). System control unit 374 instructs the selected external application program to image the document file (506). The external application program generates and outputs the document file image 394 (508). Track data imaging unit 370 shown in FIG. 28 images the pen track data 390, and provides pen track image 392 (514). Image data synthesizing unit 372 synthesizes the document file image 394 and pen track image 392, and outputs the result to display unit 364 shown in FIG. 28 (586).

The configuration and operation of the electronic memo processing apparatus in accordance with the fifth embodiment are as described above. The electronic memo processing apparatuses of the fourth and fifth embodiments may be implemented separate from each other. However, when these apparatuses are combined to be one apparatus, the effect is further improved.

Sixth Embodiment

Figure 30:
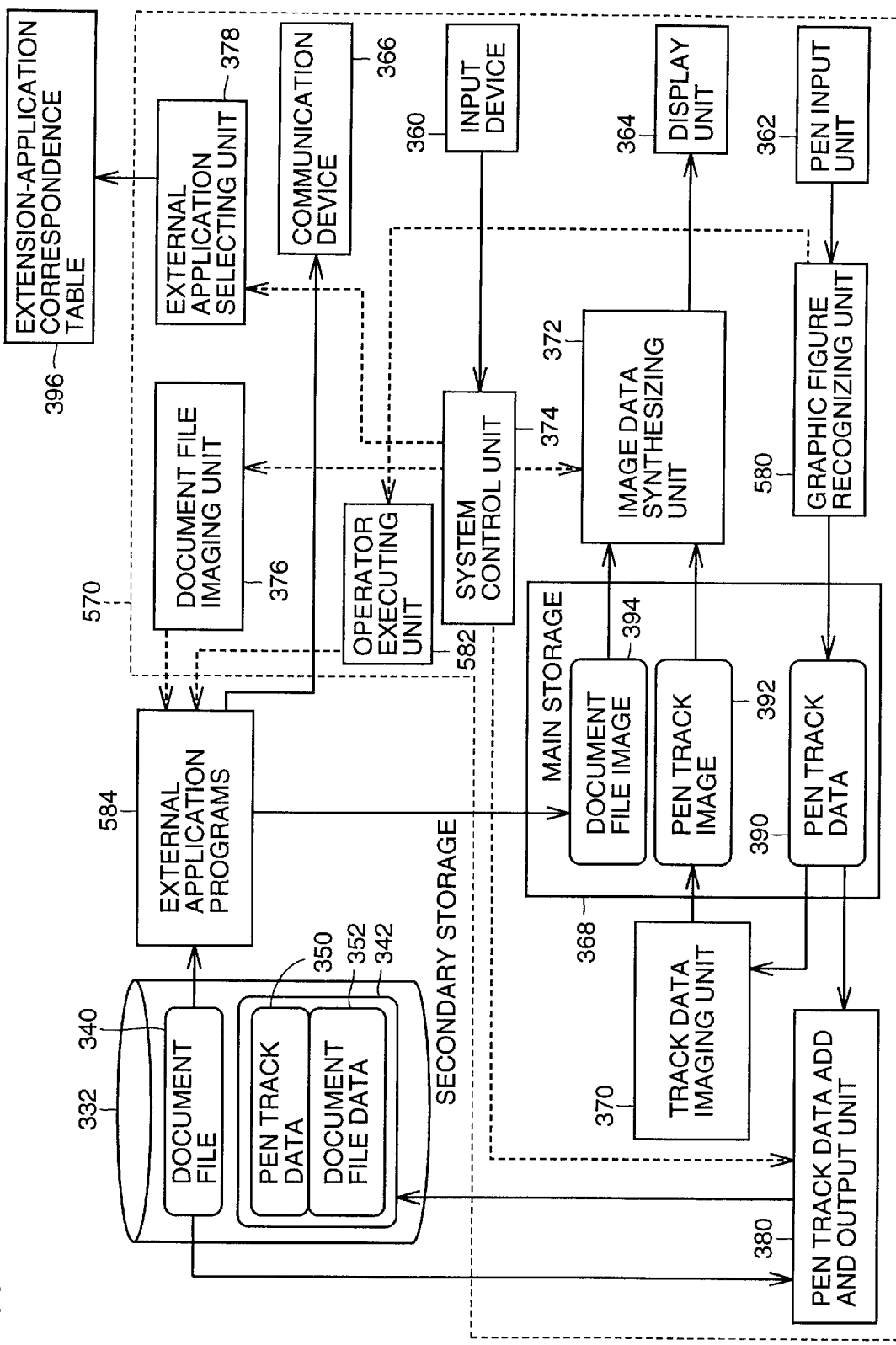
FIG. 30 is a block diagram showing configuration of the electronic memo processing apparatus in accordance with a sixth embodiment of the present invention.

An electronic memo processing apparatus in accordance with the sixth embodiment of the present invention will be described. FIG. 30 is a block diagram showing configuration of the electronic memo processing apparatus 570. What is different from FIG. 20 is that a graphic figure recognizing unit 580 for recognizing a figure input by the user through pen input unit 362, and an operator executing unit 582 for executing, when the graphic figure recognized by the graphic figure recognizing unit 580 is a prescribed operator figure, a process corresponding to the operator, are newly provided. Except these points, electronic memo processing apparatus 570 is similar to that of FIG. 20. Corresponding portions are denoted by the same reference characters, and names and functions of these portions are also similar. Therefore, detailed description thereof is not repeated here.

Here, "operator" refers to a graphic figure drawn by the user through pen input unit 362, for instructing an operation to the document file. In this context, "graphic figure" covers characters. Operation to the document file include such operations as deletion of one line in the document, addition of an underline to a certain word, and so on.

Each operator includes an operator graphic figure, an operator name and a prescribed function. FIG. 31 shows an example of an operator table 588 containing three operators. For example, refer to the first row of FIG. 31. Here, the operator graphic figure of operator 590 is X, the operator name is "deletion" and the function is "delete the word displayed below the drawn X. The second and third rows represent operator graphic figures, operator names and functions of operators 592 and 594, respectively.

Figure 33:
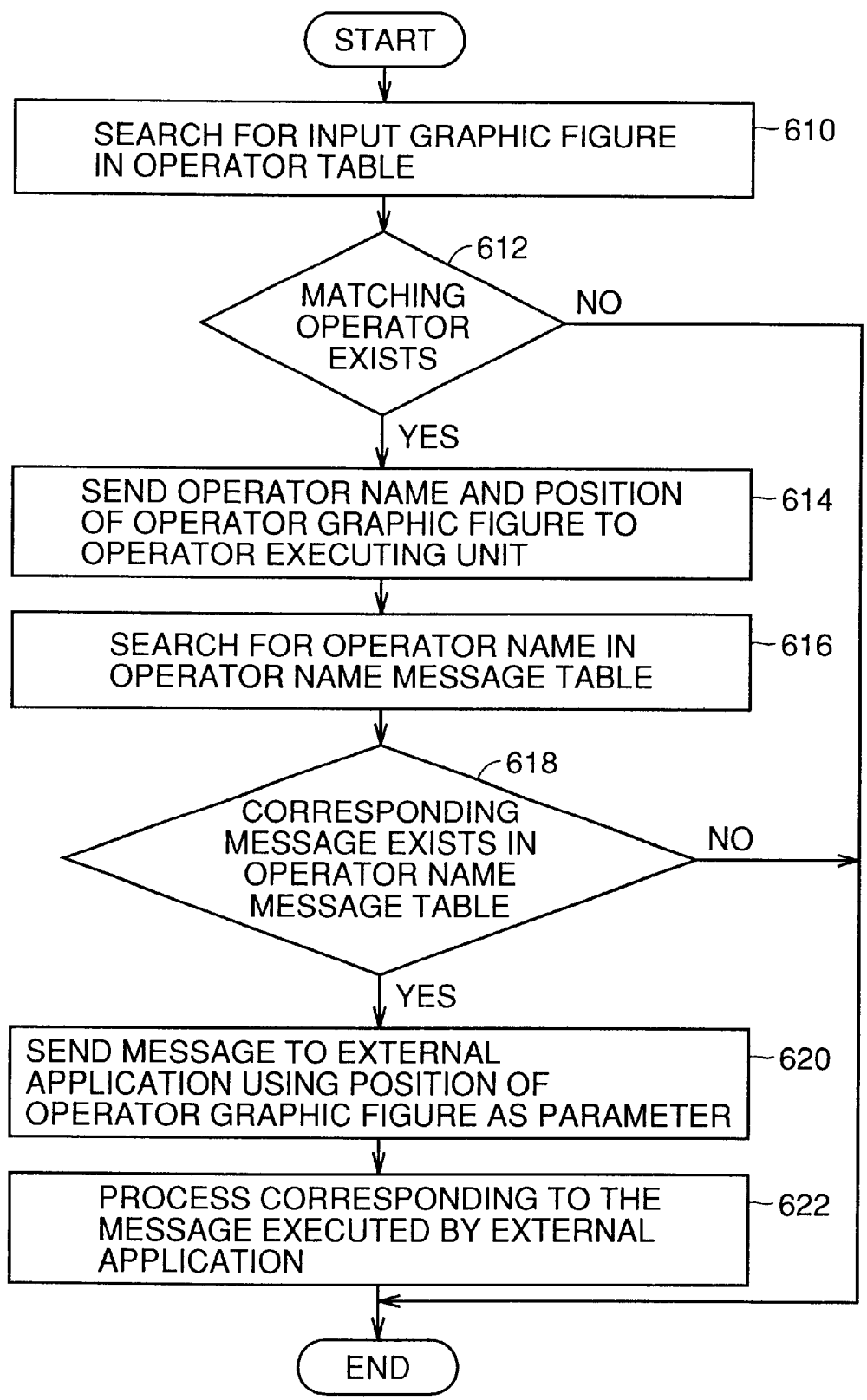
FIG. 33 is a flow chart related to the operation of the electronic memo processing apparatus in accordance with the sixth embodiment.

The operation of the electronic memo processing apparatus will be described with reference to FIGS. 30 to 32 as well as to the flow chart of FIG. 33. The graphic figure recognizing unit 580 of FIG. 30 is provided with the operator table 588 shown in FIG. 31. Graphic figure recognizing unit 580 compares the pen track input by the user through pen input unit 362 with the operator graphic data of operator table 588 (610) and if the pen track is sufficiently similar to the operator graphic data (YES in 612), it determines that the pen track is the operator. The graphic figure recognizing unit 580 passes the operator name and coordinate position of the operator graphic figure to operator executing unit 582 (614).

Operator executing unit 582 contains an operator name message table 600 shown in FIG. 32 provided therein. Operator name message table 600 represents, in the form of a table, correspondence between operator names and messages to be transmitted to the application. For example, the first row 602 contains "deletion" operator and corresponding message "WM_USER_DELETE_WORD" to the external application, described as a pair. The same applies to other rows 604 and 606.

Operator executing unit 582 searches for the received operator name in the operator name message table 600 (616), selects a message corresponding to the operator name (618), and transmits the same to the external application, using the coordinate position passed from the graphic figure recognizing unit 580 as a parameter (620). The external application as the destination of transmission is selected by the external application selecting unit 378 as in the fourth or fifth embodiment. Upon reception of the message, external application program 584 performs a process corresponding to the message (622).

When it is determined in step 612 that there is not a matching operator, or if it is determined in step 618 that there is not a corresponding message in the operator name message table 600, operation on the document file mentioned above is not performed, and the input graphic figure is processed as a memo.

Through the above described procedure, operation on the document file such as deletion of a word in the document file or underlining can be done without any complicated operation such as mode switching. Further, at this time, it is possible to add handwritten memo to the document as in the fourth or fifth embodiment. Further, operation to the document file is possible by handwritten pen input, in the similar manner as the addition of the memo. Therefore, even a user not accustomed to keyboard operation can add electronic memo to the document or operate the document electronically, in the similar, easy manner as performed on a paper document.

Seventh Embodiment

Figure 34:
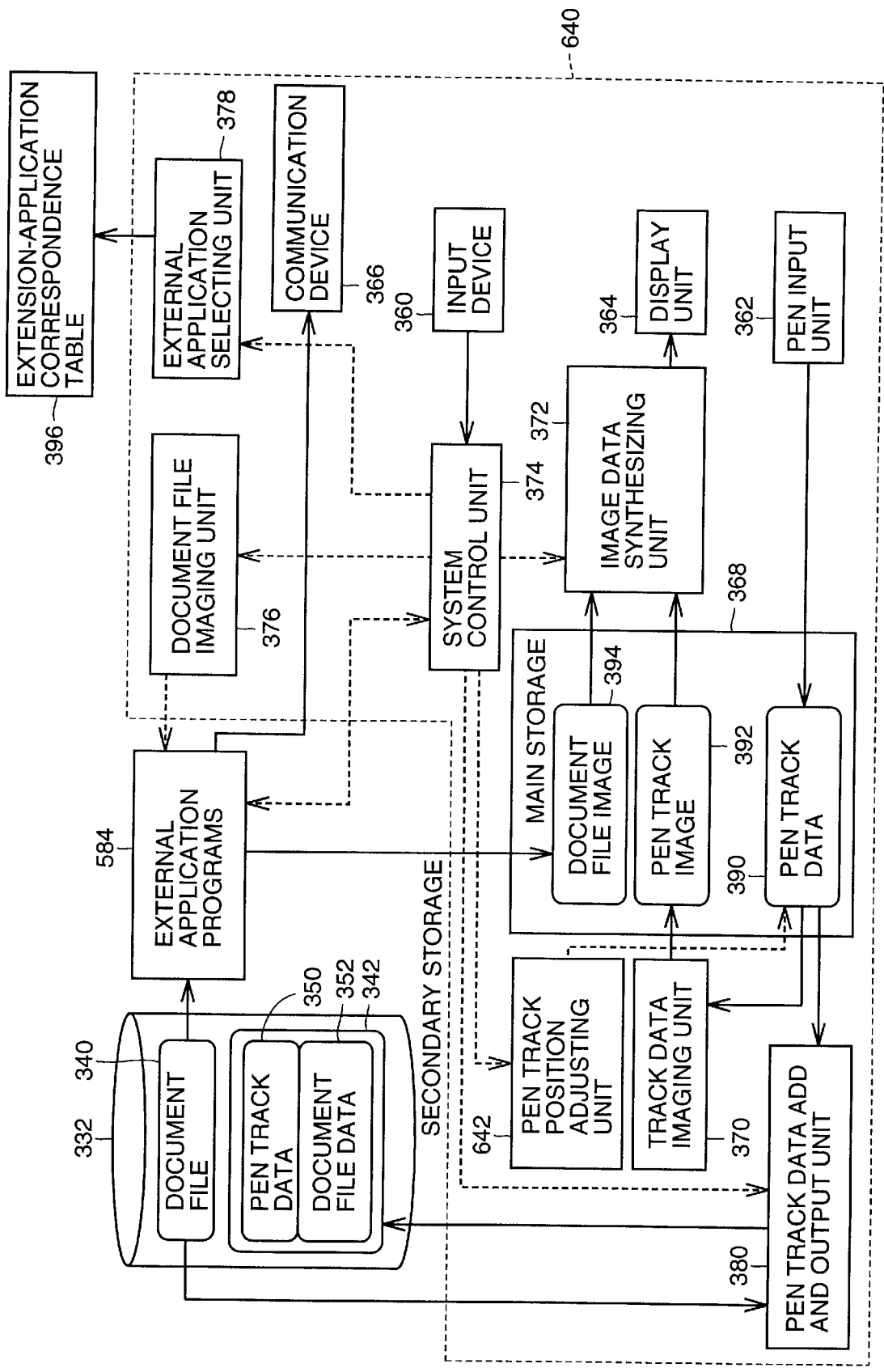
FIG. 34 is a functional block diagram showing configuration of the electronic memo processing apparatus in accordance with a seventh embodiment.

The electronic memo processing apparatus in accordance with the seventh embodiment of the present invention will be described. FIG. 34 is a functional block diagram showing configuration of the electronic memo processing apparatus in accordance with the seventh embodiment. The apparatus shown in FIG. 34 has basically the same configuration as that of FIG. 20. However, in addition to the components of FIG. 20, a pen track position adjusting unit 642 for adjusting the position of display of pen track in accordance with a change made on the document file, is provided. In FIG. 34, portions corresponding to those of FIG. 20 are denoted by the same reference characters, and these portions have similar functions and names. Therefore, detailed description thereof is not repeated here.

Figure 36:
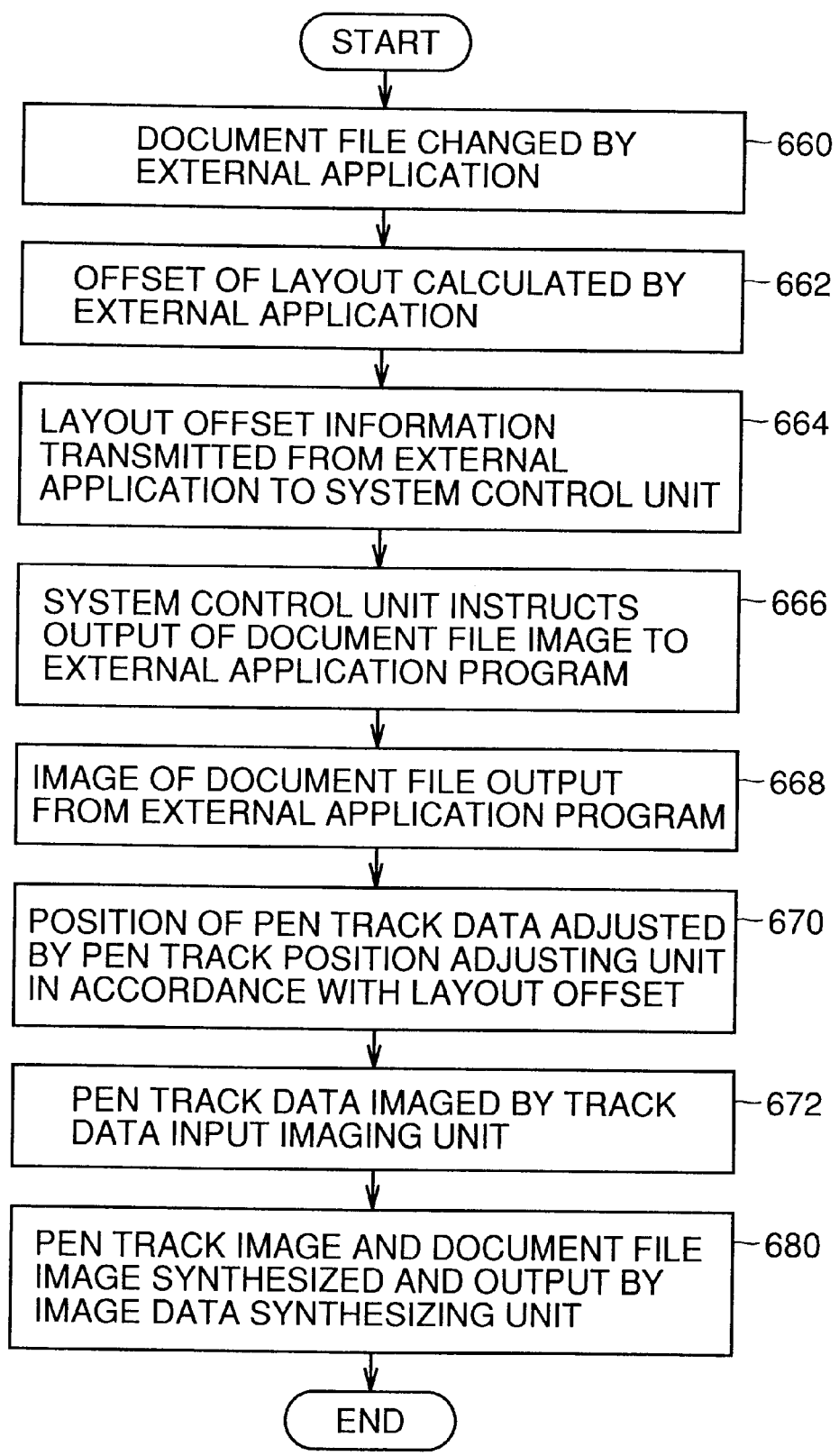
FIG. 36 is a flow chart showing the operation of the electronic memo processing apparatus in accordance with the seventh embodiment.

The characteristic operation of the electronic memo processing apparatus 640 will be described referring additionally to the flow chart of FIG. 36. When the data of the document file 340 is changed by external application program 584 (660) and the document represented by the document file 340 is displayed or printed, characters are shifted or offset at portions following the changed portion. External application program 584 calculates the offset (662) and provides layout offset information to system control unit 374 (664). It is assumed that such a function is implemented as a plug-in, in the external application program 584.

System control unit 374 instructs re-output of the document file image after the change, to external application program 584 (666). In response, external application program 584 develops and outputs the document file image 394 (668). Further, in accordance with the layout offset information applied from external application program 584, system control unit 374 instructs pen track position adjusting unit 642 to adjust the position of the pen track data. In response, pen track position adjusting unit 642 adjusts the position of the pen track data to be matched with the layout offset (670).

Further, system control unit 374 instructs track data imaging unit 370 to produce an image of the pen track data with its position adjusted, and in response, track data imaging unit 370 produces an image of the pen track data with its position adjusted.

Further, system control unit 370 instructs image synthesizing unit 372 to synthesize the pen track image 392 with its position adjusted by pen track position adjusting unit 642 and produced by track data imaging unit 370, with the document file image 394 with changes made, output from external application program 584, and to output the synthesized image to display unit 364. In response, image data synthesizing unit 372 synthesizes pen track image 392 and document file image 394, and outputs the result to display unit 364 (680).

As the document file is changed in the above described manner, even when positions of respective characters in the document file are offset, the pen track input by the user also moves correspondingly, and therefore there is not an offset between the display of the document file and the pen track. This operation will be described with reference to FIG. 35.

Referring to FIG. 35, assume that there is a synthesized image 690 displayed, which image includes the original document file image and pen track data image synthesized. Here, the second line of the document is deleted. Accordingly, the lines following the third line are offset or shifted upward by the width of the line pitch, as shown in synthesized image 692 showing the document after modification. As a result, there is generated an offset between the display of the document file image and the pen track image (it is noted that in the present embodiment, such an offset display is not given, and correction corresponding to the offset is immediately made in case an offset occurs).

At this time, external application program 584 provides the offset information to the system control unit 374. This information includes what dot counted from the top of the image and the following dots are shifted upward by how many dots. According to the information, pen track position adjusting unit 642 re-adjusts the position of the pen track data, and therefore, the image of the pen track data is drawn at right position on the document file image, as represented by the synthesized image 694 after adjustment of FIG. 35.

Modification includes not only deletion but also insertion, movement, copy from other portion and so on. When there is an insertion, the layout is shifted downward by the modification. Modification of the position of display of the electronic memo in that case is performed in the similar manner as in the case of a deletion.

In this manner, even when an electronic memo is added to a certain document and thereafter the document is modified, causing a change in the layout, the electronic memo can still be displayed at a right position on the document.

Eighth Embodiment

The electronic memo processing apparatus in accordance with an eighth embodiment of the present invention will be described. The basic configuration of the electronic memo processing apparatus is the same as that of the fourth embodiment. The electronic memo processing apparatus in accordance with the eighth embodiment includes, in addition to the configuration of the fourth embodiment, a user name acquiring unit for adding current user name of the apparatus creating the electronic memo to the document file 342 with pen track data added.

A common computer OS (Operating System) has a command or an API function for acquiring a user name specifying the user using the computer prepared in advance. By calling such a command or the API function from the program, the name of the user using the apparatus can be obtained. By utilizing the function provided by the OS, the user name can be acquired.

Figure 37:
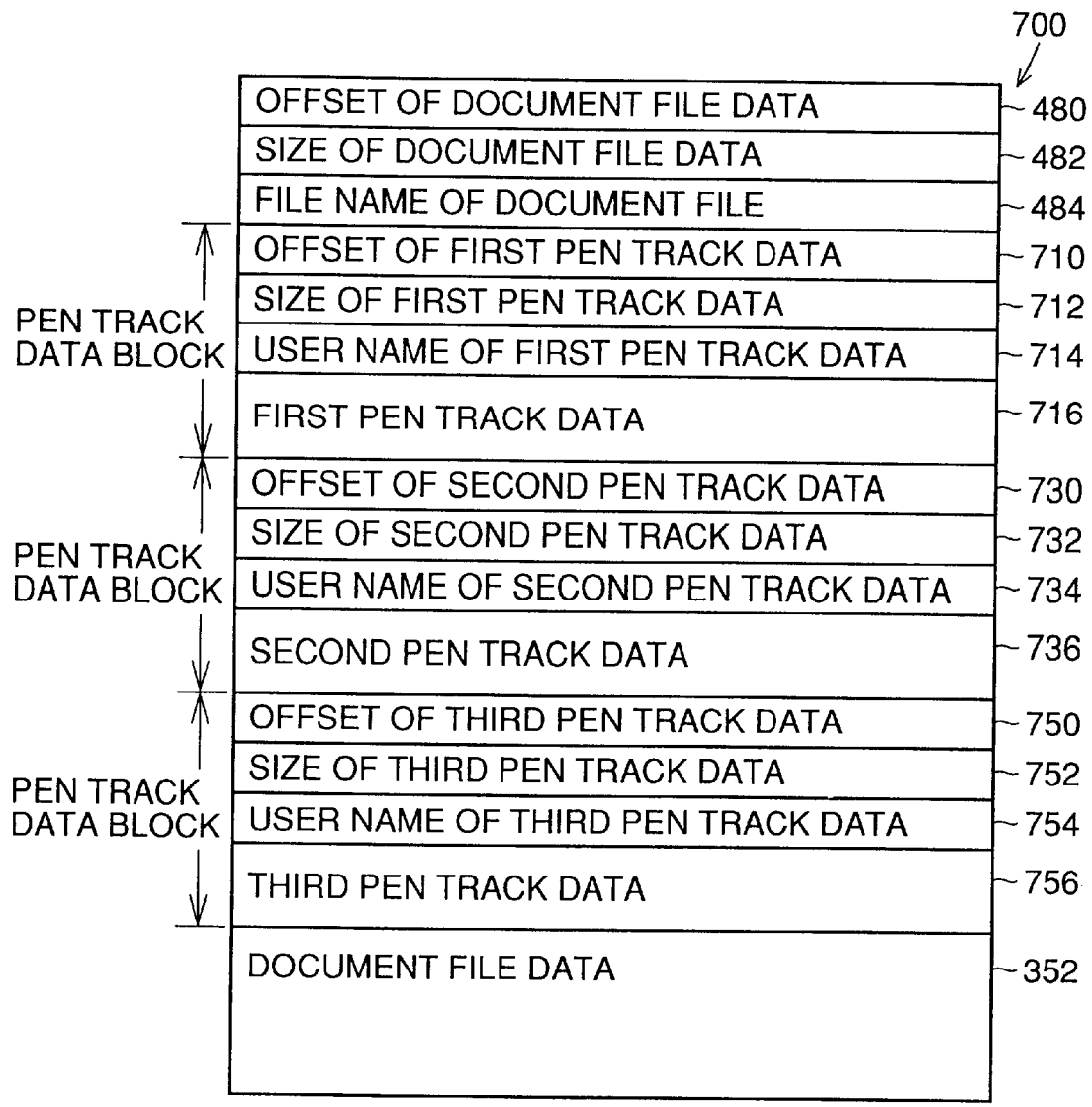
FIG. 37 shows format of a document file with pen track data in the electronic memo processing apparatus in accordance with an eighth embodiment of the present invention.

The electronic memo processing apparatus in accordance with the eighth embodiment provides a document file 700 with pen track data added and containing the user name acquired in this manner, in such a format as shown in FIG. 37. Referring to FIG. 37, document file 700 with pen track data added and containing the user name includes offset 480 to the document file data, size 482 of the document file data, file name 484 of the document file, and document file data 352 as well as a plurality of pen track data blocks (three in the example of FIG. 37). The first pen track data block includes an offset 710 of the first pen track data, size 712 of the first pen track data, user name 714 of the first pen track data, and first pen track data 716. User name 714 of the first pen track data is the user name of the first pen track data acquired in the above described manner, which represents the person who inputted the first pen track data. Offset 710 of the first pen track data, size 712 of the first pen track data and the first pen track data 716 correspond to offset 486 of the pen track data, size 488 of the pen track data and the pen track data 350 shown in FIG. 26, respectively.

Similarly, the second pen track data block includes offset 730 of the second pen track data, size 732 of the second pen track data, user name 734 of the second pen track data and the second pen track data 736. User name 734 of the second pen track data represents the user name of the second pen track data acquired in the above described manner, and represents the person who inputted the second pen track data 736.

Similarly, the third pen track data block includes offset 750 of the third pen track data, size 752 of the third pen track data, user name 754 of the third pen track data and the third pen track data 756. User name 754 of the third pen track data is the user name of the third pen track data acquired in the above described manner, and represents the person who inputted the third pen track data.

As shown in FIG. 37, it is effective to implement the present invention such that pen track data are input by a plurality of users, with respective user names added to respective pen track data. By this approach, it becomes possible to distinguish who inputted what electronic memo and further to review the memos and correctly reflect the contents of the memos to the computer document, when a document is proof-read by several persons and comments are written by several persons to the document.

Ninth Embodiment

An electronic memo processing apparatus in accordance with a ninth embodiment of the present invention will be described. Basic configuration of the electronic memo processing apparatus is the same as that of the fourth embodiment. The electronic memo processing apparatus in accordance with the ninth embodiment includes, in addition to the components of the electronic memo processing apparatus in accordance with the fourth embodiment, a time and date acquiring unit for acquiring and adding to the file a date of creation of the electronic memo.

The date acquiring unit acquires the present time and date. An OS of a common computer has a command or an API function for acquiring the present time from the program. By calling such a command or an API function from the program, the present time can be acquired.

Figure 38:
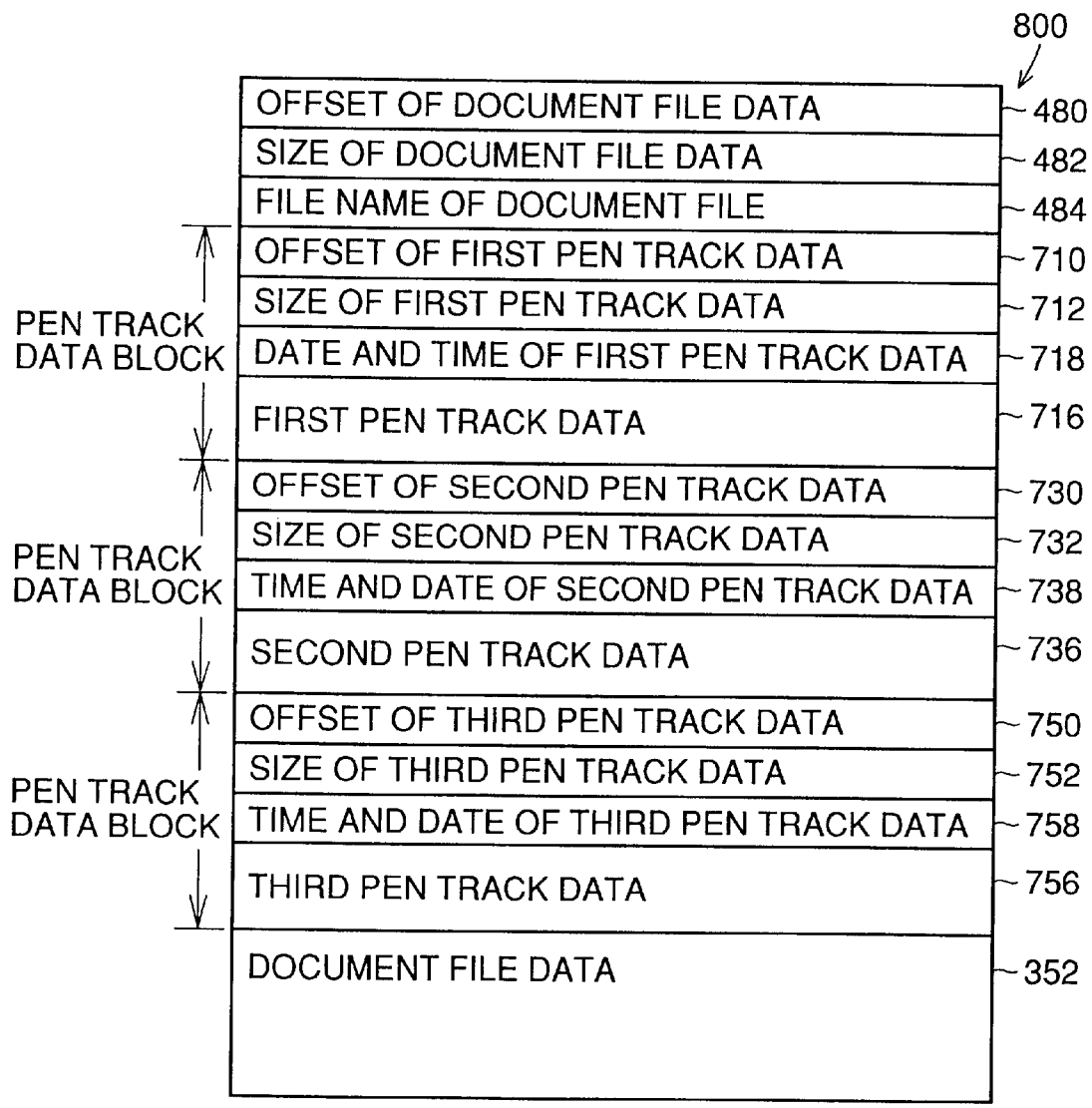
FIG. 38 shows a format of a document file with pen track data in accordance with the electronic memo processing apparatus of a ninth embodiment of the present invention.

The electronic memo processing apparatus in accordance with the ninth embodiment is implemented by outputting the time and date acquired in this manner in such a format as shown in FIG. 38. A document file 800 with pen track data added and including date of creation shown in FIG. 38 differs from document file 700 with pen track data added containing user name shown in FIG. 37 in that in place of user name 714 of the first pen track data, user name 734 of the second pen track data and user name 754 of the third pen track data, date 718 of the first pen track data, date 738 of the second pen track data and date 758 of the third pen track data are contained. Except this point, document file 800 with pen track data added containing creation date is the same as document file 700 with pen track data added containing user name.

As the file has date of creation or modification of the electronic memo (pen track data), time relation of created memos can conveniently be confirmed.

Tenth Embodiment

An electronic memo processing apparatus in accordance with a tenth embodiment of the present invention will be described. Basic configuration of the electronic memo processing apparatus is the same as the electronic memo processing apparatus in accordance with the fourth embodiment. In addition to the components of the electronic memo processing apparatus in accordance with the fourth embodiment, the electronic memo processing apparatus in accordance with the tenth embodiment includes a position information acquiring unit for acquiring and adding to the file information (position information) related to the position where the electronic memo is created.

Position information acquiring unit acquires present position. Apparatuses have been known which acquire global coordinate of a position by utilizing GPS (Global Positioning System). Some of such apparatuses allow access from a common computer. By using such an apparatus from the program, information (for example, longitude and latitude) of the place where the electronic memo is created and added can be acquired. Alternatively, not using GPS, the present place may be input by the user. For example, when the user inputs the place as "head quarter's conference room", the input place is directly output as the position information. The electronic memo processing apparatus in accordance with the tenth embodiment can be implemented by outputting position information acquired in this manner in such a format as shown in FIG. 39.

Figure 39:
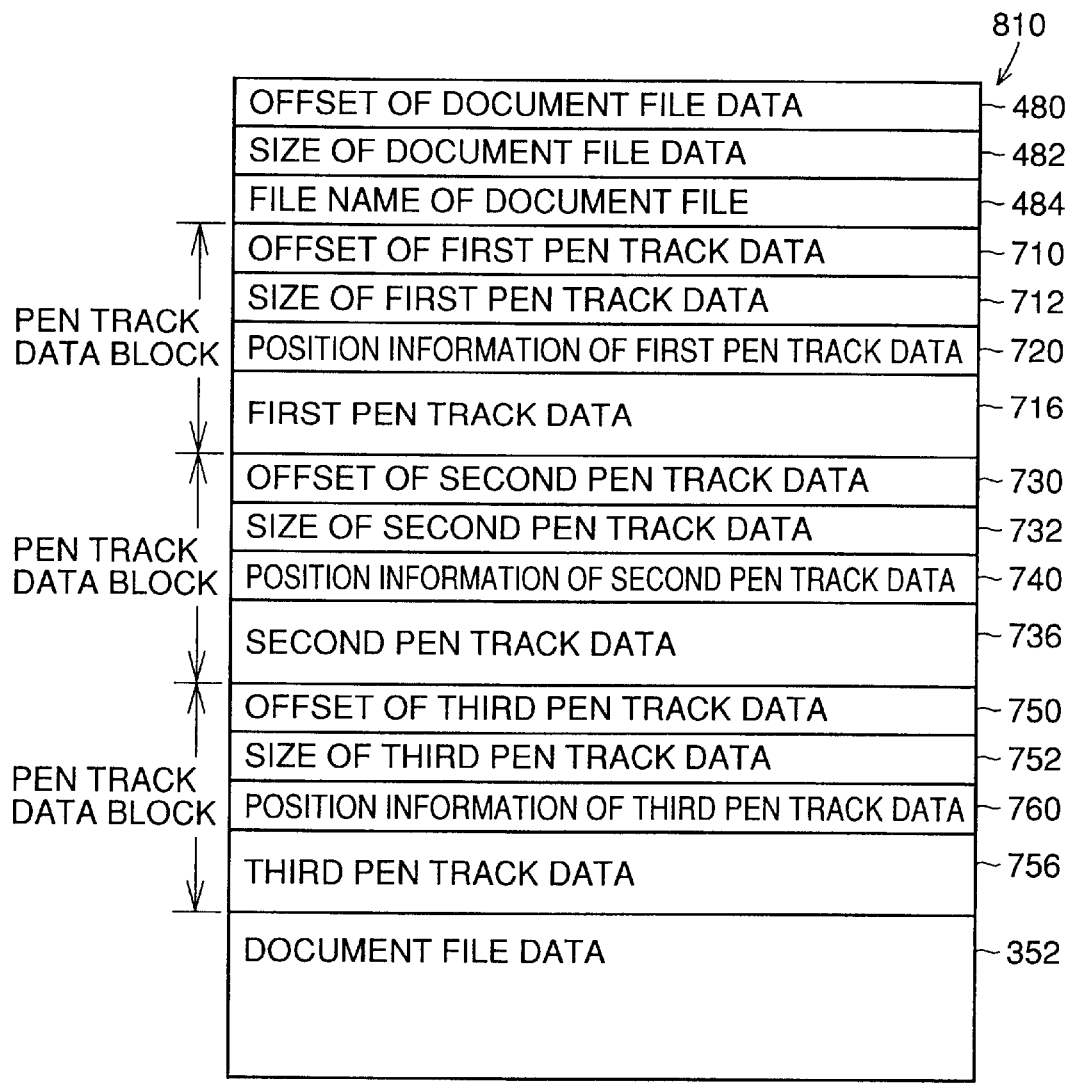
FIG. 39 shows a format of a document file with pen track data in accordance with an electronic memo processing apparatus of a tenth embodiment of the present invention.

A document file 810 with pen track data added containing position information shown in FIG. 39 is similar to the format of document file 700 with pen track data added containing user name shown in FIG. 37. The difference is that in place of user name 714 of the first pen track data, user name 734 of the second pen track data and user name 754 of the third pen track data, position information 720 of the first pen track data, position information 740 of the second pen track data and position information 760 of the third pen track data are contained, respectively. The position information 720 of the first pen track data is the position information of the first pen track data acquired in the above described manner, and represents the place where the first pen track data is input. The position information 740 of the second pen track data is the position information of the second pen track data acquired in the above described manner, and represents the place where the second pen track data is input. The position information 760 of the third pen track data is the position information of the third pen track data acquired in the above described manner, and represents the place where the third pen track data is input.

As document file 810 with pen track data added containing position information related to the place where the electronic memo (pen track data) is created or modified is used, it can be readily known where modification or proof reading is done if a document is proof-read or modified by several persons at distant places while transferring the document data through the network. Further, when a person creates memos at various places on the way of travel, the places can be confirmed.

Eleventh Embodiment

An electronic memo processing apparatus in accordance with an eleventh embodiment of the present invention will be described. Basic configuration of the electronic memo processing apparatus is the same as the electronic memo processing apparatus in accordance with the fourth embodiment. In addition to the components of the electronic memo processing apparatus in accordance with the fourth embodiment, the electronic memo processing apparatus in accordance with the eleventh embodiment further includes an identifier acquiring unit for adding an identifier of the pen track data to document file 342 with pen track data added.

Figure 27:
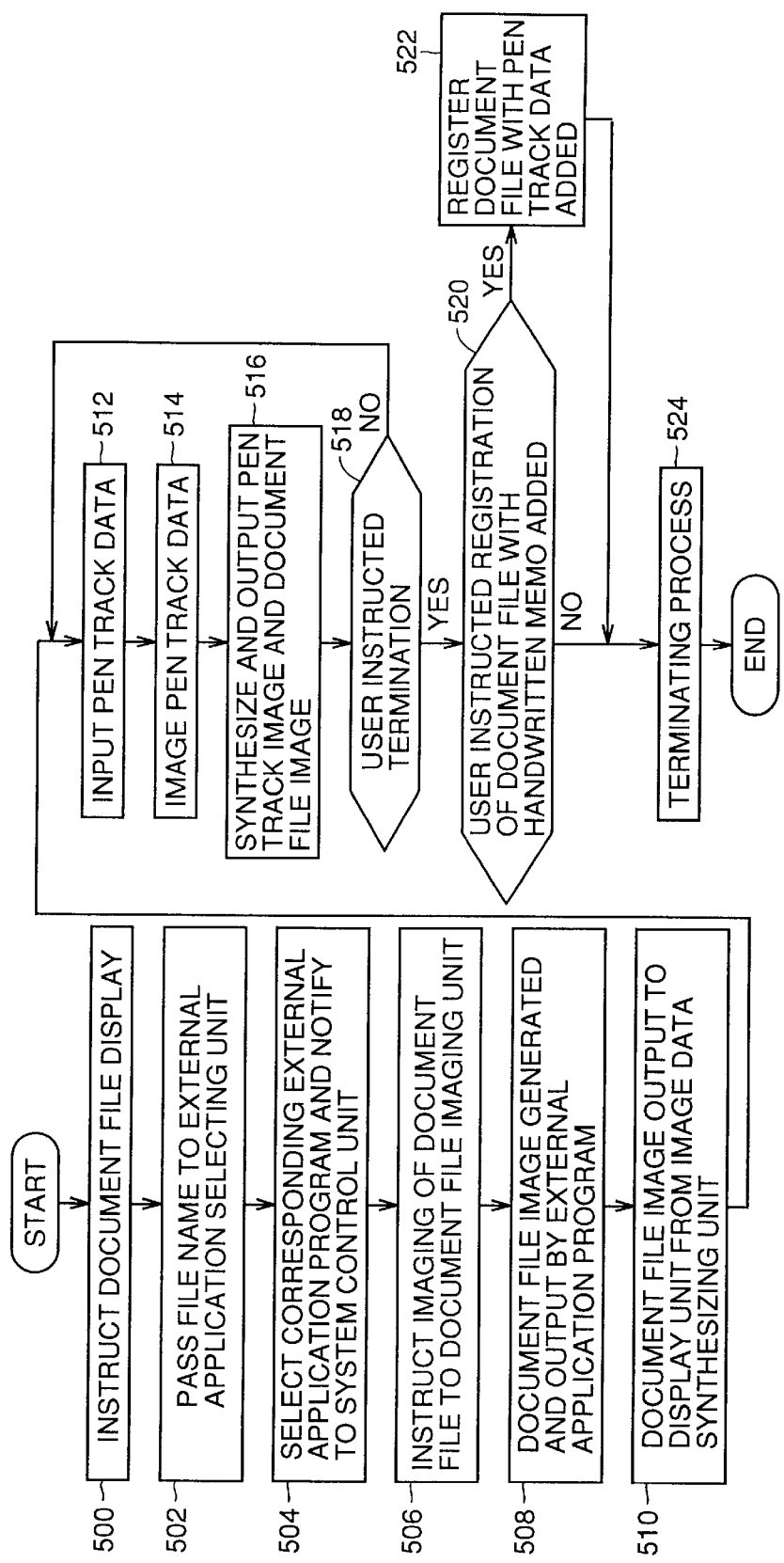
FIG. 27 is a flow chart illustrating an operation of the electronic memo processing apparatus.

The process is almost the same as the flow chart shown in FIG. 27 except the following point. In step 522 of registering a document file with pen track data added shown in FIG. 27, an inquiry is sent to the user asking an identifier to be added to the pen track data. The identifier is added to the pen track data as attribute, and the pen track data with the attribute is added to the document file, which is then registered.

Figure 40:
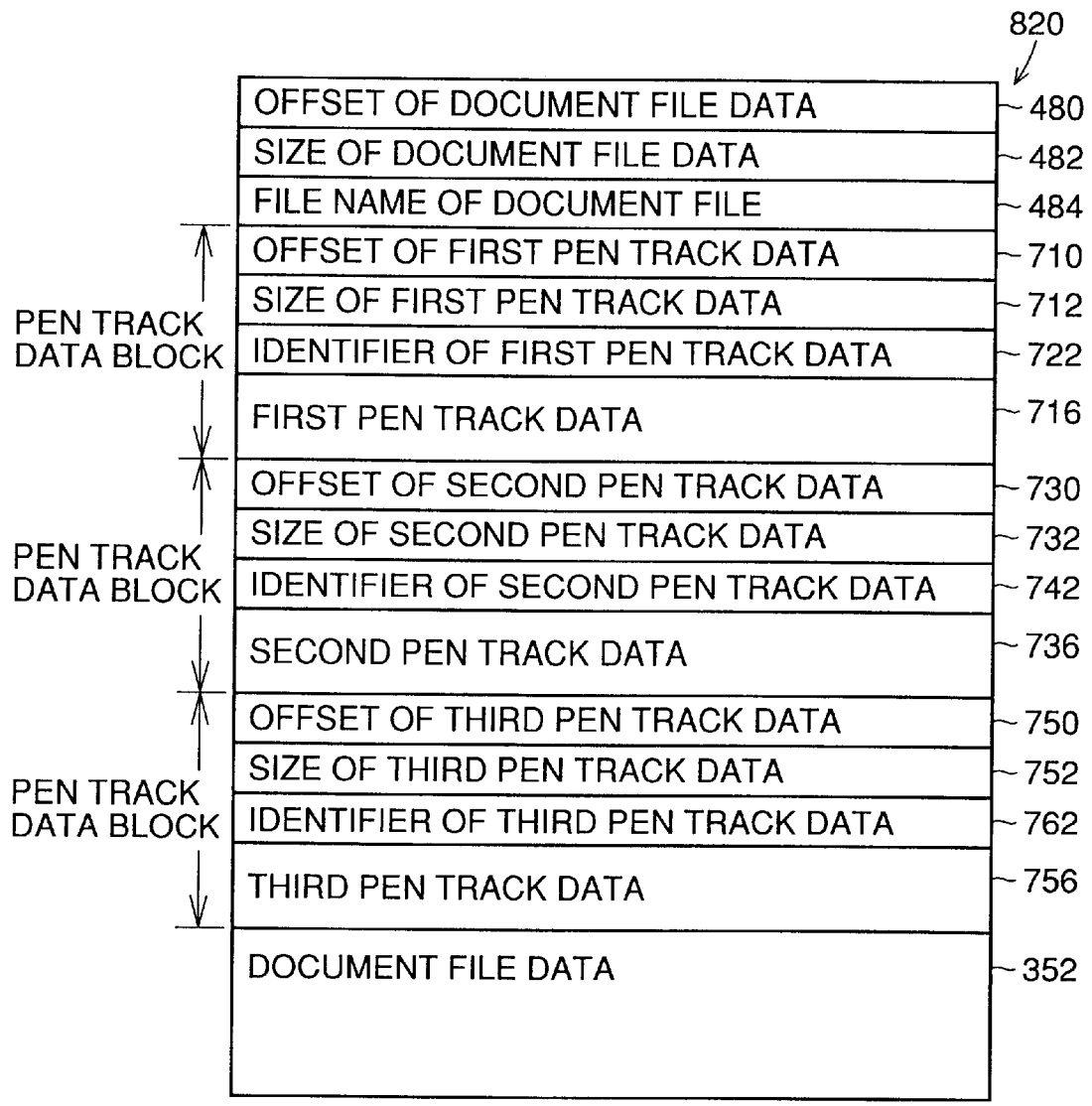
FIG. 40 shows a format of a document file with pen track data in accordance with an electronic memory processing apparatus of an eleventh embodiment of the present invention.

FIG. 40 shows the format to be registered. Referring to FIG. 40, a document file 820 with pen track data added containing an identifier differs from document file 700 with pen track data added containing user name shown in FIG. 37 in that in place of user name 714 of the first pen track data, user name 734 of the second pen track data and user name 754 of the third pen track data of FIG. 37, an identifier 722 of the first pen track data, an identifier 742 of the second pen track data and an identifier 762 of the third pen track data are contained.

As an identifier is added when an electronic memo is input, memos can be distinguished from each other by the identifiers when the electronic memos are to be reviewed later. Accordingly, classification or selection of memos for various purposes is facilitated by the addition of appropriate identifiers, and hence integral management of the document and memos is facilitated.

Twelfth Embodiment

An electronic memo processing apparatus in accordance with a twelfth embodiment of the present invention will be described. Configuration of the electronic memo processing apparatus in accordance with the twelfth embodiment is similar to that of the fifth embodiment shown in FIG. 28. The process is almost the same as the flow chart of FIG. 29 except that the process is modified in step 514 of imaging the pen track data shown in FIG. 29.

Referring to FIG. 28, track data imaging unit 370 draws, every time a pen track data block is read, the block as an image in different color. dependent on the attribute thereof. Therefore, pen track data of different attributes are displayed in distinguishable manner. Other method of indicating difference in attribute may be possible, by changing thickness of lines, type of lines or density of lines.

As difference in attribute is represented by different colors, different thicknesses or densities of lines or the like, it is possible for the user to readily recognize the difference in meaning of the pen track data.

Thirteenth Embodiment

An electronic memo processing apparatus in accordance with a thirteenth embodiment of the present invention will be described. The configuration itself of the electronic memo processing apparatus in accordance with the thirteenth embodiment may be the same as that of the electronic memo processing apparatus in accordance with the fifth embodiment shown in FIG. 28, while the process is partially different.

More specifically, an inquiry to the user asking pen track data of what attribute is to be drawn is given using display unit 364 of FIG. 28. The user is asked to designate which pen track data with what attribute is to be drawn, through pen input unit 362. In this manner, track data imaging unit 370 draws only that pen track data block which has the attribute designated by the user, as an image. This approach allows display of only that pen track data which has a prescribed attribute, and hence the pen track data (electronic memos) can be readily distinguished from each other in accordance with the attributes.

As is apparent from the foregoing, according to the present invention, information such as comments can be added to a paper document or a document file by a simple operation similar to correction or modification of a document by using a pen. Further, the added comment and the original paper document or the document file are stored associated with each other or integrated with each other. Therefore, a file with handwritten data added can readily be transmitted appended to an electronic mail, for example. Accordingly, it becomes possible to ask for comments of persons at different, distant places, to distinguish thus provided comments from each other, and to review these comments.

Especially when comments from a plurality of users are stored in one file together with the document file, the document file and the plurality of comments can be compared and reviewed, and further, respective comments can be reviewed independent from each other. Such operation is very effective.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic memo processing apparatus, comprising:
   a document identifier for identifying an arbitrary object document;
   an electronic memo retriever for retrieving, from a storage, an electronic memo associated with the document identified by said document identifier; and
   a display device for displaying the electronic memo retrieved by said electronic memo retriever on a virtual transparent input sheet positioned such that the electronic memo is overlapped with said object document,
   wherein said object document and said electronic memo are distinct from one another and said electronic memo is stored separately from said object document; and further including:
      an electronic memo acquirer for electronically acquiring an electronic memo to said document, input by a user on said virtual transparent input sheet; and
      electronic memo storage for storing in said storage the electronic memo acquired by said electronic memo acquirer, wherein said processing apparatus associates the electronic memo with said object document;
      wherein said display device includes a display in a form of a pair of eyeglasses having a transparent display portion defined by lenses of said eyeglasses for displaying said object document and said electronic memo overlapped with each other when the eyeglasses are worn by a user.

2. An electronic memo processing apparatus, comprising:
   a document identifier for identifying an arbitrary object document;
   an electronic memo retriever for retrieving, from a storage, an electronic memo associated with the document identified by said document identifier; and
   a display device for displaying the electronic memo retrieved by said electronic memo retriever on a virtual transparent input sheet positioned such that the electronic memo is overlapped with said object document,
   wherein said object document and said electronic memo are distinct from one another and said electronic memo is stored separately from said object document; and further including
      an electronic memo acquirer for electronically acquiring an electronic memo to said document, input by a user on said virtual transparent input sheet; and
      electronic memo storage for storing in said storage the electronic memo acquired by said electronic memo acquirer, wherein said processing apparatus associates the electronic memo with said object document;
      a modification detector for detecting how layout of said object document is modified after last addition of an electronic memo to said object document; and
      a layout adjuster for adjusting position of display of an electronic memo to said object document, in accordance with layout modification of said object document detected by said modification detector.

3. An electronic memo processing apparatus, comprising:
   a document identifier for identifying an arbitrary object document;
   an electronic memo retriever for retrieving, from a storage, an electronic memo associated with the document identified by said document identifier; and
   a display device for displaying the electronic memo retrieved by said electronic memo retriever on a virtual transparent input sheet positioned such that the electronic memo is overlapped with said object document,
   wherein said object document and said electronic memo are distinct from one another and said electronic memo is stored separately from said object document; and further including:
      an electronic memo acquirer for electronically acquiring an electronic memo to said document, input by a user on said virtual transparent input sheet; and
      electronic memo storage for storing in said storage the electronic memo acquired by said electronic memo acquirer, wherein said processing apparatus associates the electronic memo with said object document;
      a determiner for determining whether said object document is stored in document storage storing a document; and
      a document registerer which, when it is determined by said determiner that said object document is not stored in said document storage, for converting said object document to a data format allowing electronic processing, and registering the converted document to a data document in said document storage.

4. An electronic memo processing apparatus, comprising:
   a document identifier for identifying an arbitrary object document;
   an electronic memo retriever for retrieving, from a storage, an electronic memo associated with the document identified by said document identifier; and
   a display device for displaying the electronic memo retrieved by said electronic memo retriever on a virtual transparent input sheet positioned such that the electronic memo is overlapped with said object document,
   wherein said object document and said electronic memo are distinct from one another and said electronic memo is stored separately from said object document; and further including:
      an electronic memo acquirer for electronically acquiring an electronic memo to said document, input by a user on said virtual transparent input sheet; and
      electronic memo storage for storing in said storage the electronic memo acquired by said electronic memo acquirer, wherein said processing apparatus associates the electronic memo with said object document; said object document is an electronic document; and said apparatus further comprising:

an operator recognizer for electronically acquiring and recognizing an operator to said document input by handwriting by a user on said virtual transparent input sheet; and a document modifier for modifying said electronic document in accordance with the operator acquired by said operator recognizer.

5. The electronic memo processing apparatus according to claim 4, further comprising:

a modification detector for detecting how layout of said object document is modified by said document modifier; and a layout adjuster for adjusting position of display of an electronic memo to said object document, in accordance with layout modification of said object detected by said modification detector.

6. An electronic memo processing apparatus, comprising:

a display device for displaying an electronic object document;

an operator recognizer for electronically acquiring handwriting from an operator and recognizing the operator by the operator's handwriting, wherein the handwriting is performed on a virtual transparent input sheet registered to be overlapped with the object document; and a document modifier for modifying said object document in accordance with the operator recognized by said operator recognizer.

7. A method of processing an electronic memo, comprising the steps of:

storing a plurality of electronic memos, wherein each electronic memo is associated with an object document and is stored separately therefrom;

identifying an arbitrary object document;

retrieving from storage an electronic memo that is associated with the document identified by said document identifying step; and displaying the electronic memo retrieved in said step of retrieving on a virtual transparent input sheet such that the electronic memo is overlapped with said object document;

electronically acquiring an electronic memo to said document input by a user on the virtual transparent input sheet registered to be overlapped with an arbitrary object document; and storing the electronic memo while associating the electronic memo with said object document, in said storage;

wherein said step of display includes the step of displaying said electronic memo on a binocular type display device having a transparent display portion displaying said object document and track of said handwritten data overlapped with each other, when worn by a user.

8. A method of processing an electronic memo, comprising the steps of:

displaying an electronic object document:

electronically acquiring handwriting from an operator and recognizing the operator by the operator's handwriting, wherein the handwriting is performed on a virtual transparent input sheet such that the handwriting is overlapped with the object document; and modifying said object document in accordance with the operator recognized in said step of recognizing the operator.

9. The recording medium according to claim 8, wherein format of said electronic memo includes a plurality of said electronic memos associated with said object document;

each of said plurality of said electronic memos includes attribute data; and said step of display displays said plurality of said electronic memos in different manner of display in accordance with the attribute.

10. The recording medium according to claim 8, wherein said object document is an electronic document; and said method of processing an electronic memo further includes the steps of electronically obtaining and recognizing an operator to said document input by handwriting by a user on said virtual transparent input sheet, and modifying said electronic document in accordance with the operator acquired in the step of recognizing the operator.

11. The recording medium according to claim 8, wherein said method of processing an electronic memo further includes the steps of detecting how layout of said object document is modified by said step of modifying document, and adjusting position of display of an electronic memo to said object document, in accordance with layout modification of said object document detected by said step of detecting modification.

12. A computer readable recording medium storing an electronic memo processing program for implementing a method of processing an electronic memo including the steps of displaying an electronic object document, electronically acquiring handwriting from an operator and recognizing the operator by the operator's handwriting, wherein the handwriting is performed on a virtual transparent input sheet such that the electronic memo is overlapped with the object document, and modifying said electronic document in accordance with the operator recognized in the step of recognizing the operator.

* * * * *